United States Patent
Takamichi

(10) Patent No.: US 7,359,331 B2
(45) Date of Patent: Apr. 15, 2008

(54) ALARM TRANSFER METHOD AND WIDE AREA ETHERNET NETWORK

(75) Inventor: Toru Takamichi, Tokyo (JP)

(73) Assignee: NEC Corporation, Tokyo (JP)

( * ) Notice: Subject to any disclaimer, the term of this patent is extended or adjusted under 35 U.S.C. 154(b) by 822 days.

(21) Appl. No.: 10/784,875

(22) Filed: Feb. 24, 2004

(65) Prior Publication Data
US 2004/0170128 A1  Sep. 2, 2004

(30) Foreign Application Priority Data
Feb. 27, 2003 (JP) .............................. 2003-051610
Apr. 28, 2003 (JP) .............................. 2003-123407

(51) Int. Cl.
*H04L 12/26* (2006.01)
(52) U.S. Cl. ....................... 370/245; 370/535
(58) Field of Classification Search ...................... None
See application file for complete search history.

(56) References Cited

U.S. PATENT DOCUMENTS

| | | | |
|---|---|---|---|
| 6,975,811 B1 * | 12/2005 | Kakizaki et al. ................ | 398/2 |
| 7,142,504 B1 * | 11/2006 | Uzun .......................... | 370/224 |
| 7,190,666 B1 * | 3/2007 | Collins et al. ............... | 370/216 |
| 2001/0038471 A1 * | 11/2001 | Agrawal et al. ............. | 359/110 |
| 2002/0116669 A1 | 8/2002 | Jain | |
| 2003/0039207 A1 | 2/2003 | Maeda et al. | |

FOREIGN PATENT DOCUMENTS

| JP | 11-112388 | 4/1999 |
|---|---|---|
| JP | 2001-127833 | 5/2001 |
| JP | 2002-94478 | 3/2002 |

OTHER PUBLICATIONS

Draft ITU-T Recommendation G.7041/Y.1303 (V0.4)Generic Framing Procedure (GFP), pp. 1-55.
Canadian Office Action dated Dec. 13, 2006.

* cited by examiner

*Primary Examiner*—Brian Nguyen
(74) *Attorney, Agent, or Firm*—McGinn IP Law Group, PLLC

(57) ABSTRACT

An alarm transfer method for use in a wide area Ethernet network has the steps of generating a plurality of fixed-length frames from an Ethernet frame sent from a client terminal, generating capsules each comprised of each of the fixed-length frames, a type field for notifying a fault, a forward relay line fault notification field for notifying a fault in a forward direction, and a backward relay line fault notification field for notifying the fault in a backward direction, multiplexing the capsules to generate a frame which is transferred to an Ethernet network, and demultiplexing capsules from a received frame to recognize a fault for each Ethernet path.

19 Claims, 18 Drawing Sheets

| Content | Detecting condition | Releasing condition | Unit of detection | Remarks | Judgment for switching |
|---|---|---|---|---|---|
| Interruption of FE input | Interruption of FE signal input | Recovery of FE signal input | Each FE path | - | - |
| FE link-down | Detection of FE link-down | Recovery from FE link-down | Each FE path | - | - |
| Abnormal multiplexed reception | Detection of "1" in forward relay line fault notification in GBP transport header of GBP capsule | Detection of "0" in forward relay line fault notification in GBP transport header of GBP capsule for a fixed time period | Each FE path | Corresponding to path AIS of SDH (HP-AIS) | - |
| Error in multiplexed reception data | Detection of CRC error in GBP capsule | No detection of CRC error in GBP capsule | Each FE path | Corresponding to B3 error of SDH (HP-BIP error) | - |
| Interruption of opposing side link | Detection of "1" in client line fault notification in type field of GBP core block of GBP capsule | Detection of "0" in client line fault notification in type field of GBP core block of GBP capsule | Each FE path | - | - |
| Abnormal transmission path | Detection of "1" in backward relay line fault notification in GBP transport header of GBP capsule | Detection of "0" in backward relay line fault notification in GBP transport header of GBP capsule | Each FE path | Corresponding to path RDI of SDH (HP-RDI) | - |
| GBP capsule SD | CRC error rate of GBP capsule is in range of 10e-3 to 10e-6 | Release when value is at 1/10 of error rate previously set | Each FE path | Corresponding to deterioration in B3 error rate of SDH (P-SD) | - |
| Deterioration in error rate of GbE | GbE multiplexed reception error rate is in range of 10e-3 to 10e-7 | Release when value is at 1/10 of error rate previously set | Each GbE line (Each section) | Corresponding to deterioration in B2 error rate of SDH (SD) | SD |
| Data error in GbE multiplexed reception | Detection of FCS error of GbE or detection of multiplexed MAC frame header HEC error | No detection of FCS error of GbE or no detection of multiplexed MAC frame header HEC error | Each GbE line (Each section) | Corresponding to B2 error of SDH (MS-BIP error) | SF |
| Abnormal APS byte | K1 & K2 do not coincide for consecutive three times for a fixed period or K1 includes undefined pattern | Recovery from the detection condition listed left | Each GbE line (Each section) | Corresponding to PSBF of SDH | SF |
| Interruption of GbE optical input | Interruption of GbE optical input | Recovery of GbE optical input | Each GbE line (Each section) | Corresponding to LOS of SDH | SF |
| GbE link-down | Detection of GbE link-down | Recovery from GbE link-down | Each GbE line (Each section) | Corresponding to LOS of SDH | SF |

FIG. 15

| Content | Detecting condition | Releasing condition | Unit of detection | Remarks | Judgment for switching |
|---|---|---|---|---|---|
| Interruption of GbE optical input | Interruption of GbE optical input | Recovery of GbE optical input | Each GbE line (Each section) | Corresponding to LOS of SDH | SF |
| GbE link-down | Detection of GbE link-down | Recovery from GbE link-down | Each GbE line (Each section) | Corresponding to LOS of SDH | SF |
| Abnormal multiplexed reception | H1/H2 bytes of VC-4 are all "1" for consecutive three frames | H1/H2 bytes of VC-4 are not all "1" (No protection) | | | - |
| Abnormal multiplexed reception (Monitor) | Detection of "1" in forward relay line fault notification in GBP transport header of GBP capsule | Detection of "0" in forward relay line fault notification in GBP transport header of GBP capsule for a fixed time period | Each FE path | Corresponding to monitoring path AIS of SDH (HP-AIS) | - |
| Error in multiplexed reception data (Monitor) | Detection of CRC error in GBP capsule | No detection of CRC error in GBP capsule | Each FE path | Corresponding to monitoring B3 error of SDH (HP-BIP error) | - |
| Interruption of opposing side link (Monitor) | Detection of "1" in client line fault notification in type field of GBP core block of GBP capsule | Detection of "0" in client line fault notification in type field of GBP core block of GBP capsule | Each FE path | Corresponding to monitoring path RDI of SDH (HP-RDI) | - |
| Abnormal transmission path (Monitor) | Detection of "1" in backward relay line fault notification in GBP transport header of GBP capsule | Detection of "0" in backward relay line fault notification in GBP transport header of GBP capsule | Each FE path | Corresponding to monitoring deterioration in B3 error rate of SDH (P-SD) | - |
| GBP capsule SD (Monitor) | CRC error rate of GBP capsule is in range of 10e-3 to 10e-6 | Release when value is at 1/10 of error rate previously set | Each FE path | Corresponding to deterioration in B2 error rate of SDH (SD) | SD |
| Deterioration in error rate in GbE | GbE multiplexed reception error rate is in range of 10e-3 to 10e-7 | Release when value is at 1/10 of error rate previously set | Each GbE line (Each section) | Corresponding to B2 error of SDH (MS-BIP error) | SF |
| Data error in GbE multiplexed reception | Detection of FCS error of GbE or detection of multiplexed MAC frame header HEC error | No detection of FCS error of GbE or no detection of multiplexed MAC frame header HEC error | Each GbE line (Each section) | | SF |
| Abnormal APS byte | K1 & K2 do not coincide for consecutive three times for a fixed period or K1 includes undefined pattern | Recovery from the detection condition listed left | Each GbE line, each SDH line (Each section) | | SF |
| SDH path alarm | Depending on detection condition of each POH byte error | Depending on releasing condition of each POH byte error | Each FE path | | SF |
| SDH section alarm | Depending on detection condition of each SOH byte error | Depending on releasing condition of each SOH byte error | Each SDH line (Each section) | | SF (SD for B2 error rate deterioration |
| Interrupt of SDH optical input | Interrupt of optical input | Recovery of optical input | Each SDH line (Each section) | | SF |

FIG. 18

ALARM TRANSFER METHOD AND WIDE AREA ETHERNET NETWORK

BACKGROUND OF THE INVENTION

1. Field of the Invention

The present invention relates to a wide area Ethernet network which utilizes a plurality of types of transmission networks to relay different Ethernet networks to one another, and more particularly, to an alarm transfer method for transferring fault occurrence information resulting from a line fault, a failed device and the like to a terminal device with which a communication is being made, and to a wide area Ethernet network to which the alarm transfer method is applied.

2. Description of the Related Arts

The proliferation and advancement of the Internet, intranets, and portable telephones cause a year-by-year increase in the traffic of speech and data which flow through networks. In such an environment, enterprises and service providers are imminently driven to build a wide area Ethernet network which supports the ever increasing traffic with a limited cost.

The wide area Ethernet network is built, for example, by use of an existing SONET/SDH network as a relay section to interconnect LANs, each implemented by an Ethernet network in such a manner that they can communicate with one another. For transmission in such a configuration, higher-level protocol data transferred on a LAN is encapsulated at an ingress node, which is the entrance of the wide area Ethernet network, in accordance with a protocol employed in a relay section, and is decapsulated at an egress node, which is the exit of the wide area Ethernet network. Techniques for such transmission in the wide area Ethernet network have already been brought into practical use, examples of which may be PPP over SONET (IETF RFC2615 standard), GFP (ITU-T G.7041 standard), and the like, as is known in the art. For example, when a SONET/SDH network is utilized as a relay section, encapsulated data is stored in a payload of a frame defined in the SONET/SDH network, and transferred by cross-connecting communication channels with a band which is previously set.

In the SONET/SDH network, the frame used therein comprises two types of overhead fields: SOH (Section Over Head) and POH (Path Over Head) (see, for example, ITU-T Recommendation G.707 (October 2000)). SOH is provided for managing a section which is defined as a transmission system portion of a transmission medium, while POH is provided for managing a path network layer which is independent of the transmission medium. In this way, the section and path are organized in a layered structure, and a plurality of paths are multiplexed in a payload, such that a transmission network can be organized in a layered structure comprised of a transmission medium network layer and a path network layer. This results in the ability to manage the designing, maintenance and operation of the network in a layered structure, thereby providing advanced network services. For example, since each relay node on a transmission path separately monitors SOH fault information and POH fault information, it is possible to readily find whether a communication fault, if any, is occurring in a section between relay nodes or only on a particular path, and to identify the location at which the fault is occurring.

However, since the SONET/SDH network has a large number of items to be monitored using SOH and POH, the maintenance and operation cost tends to increase. To limit the maintenance and operation cost, less expensive Ethernet networks represented by Fast Ethernet (hereinafter abbreviated as "FE") and Gigabit Ethernet (hereinafter abbreviated as "GbE") have been increasingly employed in wide area Ethernet networks for use as relay sections thereof. Alternatively, another wide area Ethernet network may include relay sections which may be implemented by a combination of an existing SONET/SDH network and an Ethernet network such as a GbE network, such that the SONET/SDH network is utilized in a certain section, while the GbE network is utilized in another section.

In the wide area Ethernet network, there are many clients which request a guaranteed transmission bandwidth and communication quality. To meet such a request, a protection function is needed for switching to a spare line if a line fault occurs. Also, alarm information indicative of the occurrence of a fault must be notified to clients placed in communication without fail. Further, since a large capacity of data is flowing through lines, a need exists for redundant transmission paths in relay sections and a reduction in a switching time upon occurrence of a fault.

In the aforementioned GFP, a client management frame shown in FIG. 1 is defined for transferring an alarm for notifying the occurrence of a fault such as a line fault, a failed device, and the like. FIG. 1 is a schematic diagram showing a format for the client management frame defined in the GFP.

As shown in FIG. 1, in the GFP, a communication partner can be notified of a fault occurring on a client line (for example, on an Ethernet line) using a UPI (User Payload Identifier) field in the client management frame. The UPI value indicates loss of signal (LOS) when it takes "00000001" and indicates link-down on a client line when it takes "10000000." In a normal state where no fault is present, the UPI value is set to a value other than the foregoing "00000001" and "1000000."

The client management frame is transferred to a communication partner at predetermined intervals while loss of signal or link-down is being detected. In different systems, the client management frame may be transferred to the communication partner as required, or transferred at predetermined intervals in a normal state where no fault is present.

A core header field shown in FIG. 1 includes such information as a source address, a destination address, and a priority, and a PTI (Payload Type Identifier) field shows how the frame is used. In FIG. 1, the PTI value is set to "100" which indicates that the frame is used as a client management frame. A PFI (Payload FCS Indicator) field shows whether or not FCS (Frame Check Sequence) is executed. The FCS is used for detecting transmission errors of payloads. An EXI (Extension Header Identifier) field stores an identifier of an extension header when it is used. In FIG. 1, the PFI value is set to "0" which indicates that the FCS is not executed, and the EXI value is set to "0000" which indicates that no extension header is used.

Next, a conventional alarm transfer method will be described with reference to a wide area Ethernet network, given as an example, which utilizes a SONET/SDH network as illustrated in FIG. 2. FIG. 2 is a block diagram illustrating an exemplary configuration of a conventional wide area Ethernet network.

The wide area Ethernet network illustrated in FIG. 2 comprises a plurality of Ethernet networks (two in FIG. 2) which are connected through a plurality of relay devices (two in FIG. 2) which make up the SONET/SDH network. The Ethernet networks are connected to relay devices 203, 204 of the SONET/SDH network through Ethernet termination devices 202, 205 contained in the respective Ethernet networks. Each of the Ethernet networks accommodates a plurality of client terminal devices (one each at the respective ends in FIG. 2. Hereinafter called the "client terminal"). Ethernet termination devices 202, 205 each time-division-multiplex data transmitted from the respective client terminals to generate SONET/SDH frames which are transmitted to relay devices 203, 204. Upon receipt of a SONET/SDH frame from relay device 203 or 204, the frame is demultiplexed into data for respective client terminals, and demultiplexed data are transmitted to the associated client terminals.

For transmitting data from an arbitrary client terminal to an opposing client terminal, a direction in which the data is transmitted is defined as a forward direction, and a direction opposite to the forward direction is defined as a backward direction. Also, a client terminal which originates data is said to be located upstream, while a client terminal which receives the data is called to be located downstream.

Each of devices which relays a communication between client terminals is collectively called the "relay node," and particularly, a node which receives a signal from a client line or client circuit is called an "ingress node," and a node which delivers a signal to a client line or client circuit is called an "egress node." In the configuration of FIG. 2, assuming that the data source is client terminal 201, and the data destination is client terminal 206, Ethernet termination device 202 is in position of the ingress node, while Ethernet termination device 205 is in position of the egress node. A data flow from a client node serving as the data source to a client node serving as the data destination through respective relay nodes is called an "Ethernet path." Relay nodes passed by a certain Ethernet path, and their port numbers have been previously set in the respective relay nodes. During a normal operation, an Ethernet path will not change to pass different relay nodes from previously set ones.

In the configuration as described above, assuming that a fault occurs, for example, on the client line between client terminal 201 in position of the data source and Ethernet termination device 202 to result in loss of signal or link-down, Ethernet termination device 202, which has detected the fault, transmits a client management frame indicative of loss of signal or link-down to Ethernet termination device 205 which is connected to client terminal 206 of the communication partner that is set in an Ethernet path. The client management frame indicative of loss of signal or link-down is transmitted at predetermined intervals while loss of signal or link-down is being detected.

Upon detection of the client management frame, Ethernet termination device 205 stops delivering a signal to associated client terminal 206, and forcefully sets the line to loss of signal or link-down. This state is maintained at all times while Ethernet termination device 205 is detecting the client management frame indicative of loss of signal or link-down.

In this way, as a fault occurs on a client line, line fault information is communicated to an opposing client line, so that the client lines appear to be directly connected to each other without causing client terminals 201, 206 to be aware of the existence of the intervening SONET/SDH network. This function for allowing the client terminal not to be aware of the existence of an intervening line or circuit is called "link-pass-through."

For providing redundant relay lines in the SONET/SDH network, SONET/SDH has provided a mechanism for realizing a switching from a failed line to a spare line within 50 milliseconds upon occurrence of a fault. For operating this mechanism, an SOH field has one byte each of K1 byte and K2 byte which are communicated to an opposing communication device that serves as a communication partner (see, for example, ITU-T Recommendation G.841 (October 1998)).

In another example of providing redundancy for Ethernet lines wherein redundant lines are provided between two communication devices, an active transmission line is set to link-down in response to detection of a fault in an active system to notify an opposing communication device of the fault on the active transmission path. Upon detection of link-down, the opposing communication device switches the active system to a redundant system (see, for example, ITU-T Recommendation G.707 (October 2000)).

The conventional wide area Ethernet network which applies the aforementioned GFP has a problem of the inability to accomplish the link-pass-through for transferring information on a fault on a relay line to a client terminal of a communication partner when an Ethernet path is relayed through a plurality of types of transmission networks, as is the case with a combination of the GbE network and SONET/SDH network. This is because a field for use in transferring an alarm provided in the client management frame defined by GFP can merely transfer information on a fault which has occurred in a client line section.

As an example, when relay devices for building the GbE network are installed between the Ethernet termination devices and the relay devices of the SONET/SDH network illustrated in FIG. 2, and a line fault occurs, for example, between the upstream Ethernet termination device and a relay device in the GbE network, this fault information cannot be transferred downstream using the client management frame because the fault information notifies a fault on a relay line. If the UPI field in the client management frame were used to transfer information on loss of signal or link-down caused by a fault on a relay line in a manner similar to a fault on a client line, the downstream Ethernet termination device could not distinguish a client line fault from a relay line fault. This will cause a problem in identifying the location of the fault. The relay device in the GbE network is similar to the Ethernet termination device in that it time-division multiplexes data received from a plurality of Ethernet termination devices for transmission to the SONET/SDH network, and demultiplexes frames received from the SONET/SDH network into individual data for transmission to associated Ethernet termination devices.

To solve the above inconvenience, in a wide area Ethernet network which utilizes the GbE network and SONET/SDH network, inherent alarm transfer systems defined in the GbE network and SONET/SDH network may be used as they are to sequentially transfer the alarm information to downstream client lines.

For example, in a wide area Ethernet network comprised only of the SONET/SDH network illustrated in FIG. 2, as a fault occurs between relay devices within the SONET/SDH network, the fault information is transferred to a downstream Ethernet termination device through a path AIS (Alarm Indication Signal) alarm defined by SONET/SDH, and also transferred to an upstream Ethernet termination device through a path RDI (Remote Defect Indication) alarm defined by SONET/SDH. Ethernet termination device 205 implements the link-pass-through by setting an Ethernet line to link-down only for those client terminals which utilize a path for which the path AIS is detected. Similarly, Ethernet termination device 202 implements the link-pass-through by setting an Ethernet line to link-down only for those client terminals which utilize a path for which the path RDI is detected.

However, assuming that the alarm transfer systems inherent to the GbE network and SONET/SDH network are used as they are for sequentially transferring alarm information to downstream client lines in a wide area Ethernet network which has relay devices for building the GbE network, each installed between each of the Ethernet termination devices and each of relay devices of the SONET/SDH network as illustrated in FIG. 2, a fault in the GbE section would cause forced disconnection of not only a line which connects a failed Ethernet termination device to a relay device of the GbE network but also lines, each of which connects a normal relay device of the GbE network multiplexed with the relay device involved in the fault to a relay device of the SONET/SDH network. As a result, a normal Ethernet path from another Ethernet termination device which passes through the relay device of the GbE network is also forcefully set to link-down.

On the other hand, in a wide area Ethernet network which stores a GFP capsule in a data field of a MAC frame such as GbE as it is for transfer, there is a problem of the inability to organize a transmission network in a layered structure comprised of a transmission medium network layer and a path network layer for designing, maintaining, and operating the network. This is because no field is defined in the MAC frame used in the Ethernet network for distinguishing the transmission medium network layer from the path network layer, thus failing to manage the section and path in a layered structure, as is done in the SONET/SDH network.

The MAC frame is comprised of a preamble field (seven octets long); an SFD (Start Frame Delimiter) field (one octet long) for frame identification; a destination MAC address (hereinafter abbreviated as "DA") field (six octets long); a source MAC address (hereinafter abbreviated as "SA") field (six octets long); a LENGTH/TYPE field (two octets long) indicative of the frame length or type; a data field (46 to 1,500 octets long); and an FCS (Frame Check Sequence) field (four bytes) for CRC operation. Errors can be detected in received frames by monitoring the FCS field.

However, the MAC frame lacks for a field for distinguishing the section from the path for management, so that even if an error is detected in the CRC operation with the FCS field, it is not possible to immediately identify whether the error is associated with a fault in a transmission medium network layer or with a fault in an individual path network layer independent of a transmission medium. For the identification, the detected error must be compared with fault information generated by the preceding and subsequent relay nodes.

Further, in a wide area Ethernet network which includes relay sections comprised of a combination of an existing SONET/SDH network and an Ethernet network such as a GbE network, such that the SONET/SDH network is utilized in certain sections and the GbE network is utilized in the remaining sections, when an Ethernet network switching means used for providing redundancy for both the SONET/SDH network and Ethernet network involves forcefully bringing an active system, which detects an existing fault on a transmission path, to link-down to notify the fault on the transmission path to an opposing communication device for switching the system, a relay node which serves as a junction of the SONET/SDH network with the Ethernet network must be provided with two different types of switching means, i.e., a switching means which uses the K1 byte and K2 byte of the SONET/SDH network, and a switching means which uses link-down of the Ethernet network, thus resulting in an increase in the circuit scale, mounting area, and switching time.

SUMMARY OF THE INVENTION

The present invention has been made to solve the problems which are still left unsolved in the prior art as mentioned above, and it is an object of the invention to provide an alarm transfer method for use in the wide area Ethernet network utilizes a plurality of types of transmission networks such as the GbE network, SONET/SDH network, and the like for relay sections, the method being capable of notifying an upstream or a downstream client line of relay line fault information without causing link-down of a normal Ethernet path.

It is another object of the present invention is to provide a wide area Ethernet network which utilizes a plurality of types of transmission networks such as the GbE network, SONET/SDH network, and the like for relay sections, and which is capable of notifying an upstream or a downstream client line of relay line fault information without causing link-down of a normal Ethernet path.

It is another object of the present invention to realize a wide area Ethernet network which is capable of managing a transmission medium network layer and a path network layer in a layered structure to provide advanced network services.

According to the first aspect of the present invention, an alarm transfer method for mutually notifying client terminals placed in communication that a fault occurs in a wide area Ethernet network which has Ethernet networks each for accommodating client lines from the client terminals and a plurality of types of transmission networks for connecting the Ethernet networks to one another is provided. The method includes the steps of:

dividing an Ethernet frame sent from one of the client terminal every predetermined fixed length to generate a plurality of fixed-length frames;

generating capsules each comprised of each of the fixed-length frames, a type field for notifying a fault occurring on one of the client lines, a forward relay line fault notification field for notifying a fault occurring in the transmission network in a forward direction, and a backward relay line fault notification field for notifying the fault in a backward direction, together with the fixed-length frame;

multiplexing the generated capsules for each of a plurality of Ethernet paths set between client terminals placed in communication to generate a frame adapted for the transmission network, and transferring the frame to an Ethernet network which accommodates a destination client terminal; and demultiplexing the respective capsules from the received frame, and referencing the type field, the forward relay line fault notification field, and the backward relay line fault notification field to recognize the fault occurring on the one client line or the fault occurring in the transmission network for each of the Ethernet paths.

In this event, the forward relay line fault notification may be transferred down to an egress node which is an edge node of an Ethernet network that accommodates the destination client terminal, and a backward relay line fault notification corresponding to the forward relay line fault notification may be issued from the egress node to an ingress node which is an edge node of an Ethernet network that accommodates a source client terminal.

Upon detection of the forward relay line fault notification, the egress node may set a client line downstream of a corresponding Ethernet path to link-down when the fault notification is not cleared even after the lapse of a predetermined protection time. On the other hand, upon detection of the backward relay line fault notification, the ingress node may set a client line upstream of a corresponding Ethernet path to link-down.

In another aspect, a wide area Ethernet network according to the present invention has Ethernet networks each for accommodating client lines from client terminals, and a plurality of types of transmission networks for interconnecting the Ethernet networks, wherein a fault occurring on one of the client line or in the transmission network is mutually notified between the client terminals placed in communication. The wide area Ethernet network includes a multiplexer which functions as an edge node of the Ethernet network. Upon receipt of an Ethernet frame sent from one of the client terminals, the multiplexer divides the Ethernet frame every predetermined fixed length to generate a plurality of fixed-length frames, generates a capsule comprised of each of the fixed-length frames, a type field for notifying a fault occurring on one of the client lines, a forward relay line fault notification field for notifying a fault occurring in the transmission network in a forward direction, and a backward relay line fault notification field for notifying the fault in a backward direction, multiplexes the generated capsules for each of a plurality of Ethernet paths set between client terminals placed in communication, to generate a frame adapted for the transmission network, and transfers the frame to an Ethernet network which accommodates a destination client terminal. Upon receipt of a frame from the transmission network, the multiplexer demultiplexes the respective capsules from the frame for each of Ethernet paths set between client terminals placed in communication, and references the type field, the forward relay line fault notification field, and the backward relay line fault notification field to recognize the fault occurring on the one client line or the fault occurring in the transmission network for each of the Ethernet paths.

In this event, the multiplexer may issue the forward relay line fault notification to an egress node which is an edge node of an Ethernet network that accommodates a destination client terminal when the multiplexer operates as an ingress node which is an edge node of the Ethernet network that accommodates a source client terminal. Upon detection of the forward relay line fault notification, the multiplexer may issue a backward relay line fault notification corresponding to the forward relay line fault notification toward the ingress node, when the multiplexer operates as the egress node.

Alternatively, upon detection of the forward relay line fault notification, the multiplexer may forcefully set a client line downstream of a corresponding Ethernet path to link-down when the fault notification is not cleared even after the lapse of a predetermined protection time when the multiplexer operates as the egress node. On the other hand, upon detection of the backward relay line fault notification, the multiplexer may forcefully set a client line upstream of a corresponding Ethernet path immediately to link-down when the multiplexer operates as the ingress node.

In the alarm transfer method and wide area Ethernet network as described above, information on a fault occurring in a transmission network can be transferred both in the forward direction and in the backward direction by providing the transport header of the GBP capsule with the forward relay line fault notification field and backward relay line fault notification field. Further, a fault on a client line can be notified to a client terminal of a communication partner using the type field in the GBP core block. Thus, according to the present invention, the egress node can accomplish the link-pass-through for a downstream client terminal in units of Ethernet paths, while the ingress node can accomplish the link-pass-through for an upstream client terminal in units of Ethernet paths.

Also, by transferring the forward relay line fault notification down to the egress node and issuing a backward relay line fault notification therefrom, information on a fault occurring in a transmission network can be transferred to respective Ethernet networks which accommodate a source client terminal and a destination client terminal, respectively, so that the link-pass-through of a relay line fault can be accomplished even in a wide area Ethernet network which includes a plurality of types of transmission networks. Further, an APS timer circuit for counting a protection time may be provided only in the egress node. Generally, since the APS timer circuit must be provided in each Ethernet path, the circuit scale per node can be limited by providing the APS timer circuit in the single egress node than by providing the APS timer circuit in each of a larger number of relay devices for multiplexing Ethernet paths.

According to the third aspect of the present invention, a wide area Ethernet network comprises:

an ingress node for dividing a higher-level protocol data sent from each of a plurality of client terminals every predetermined fixed length to generate a plurality of fixed-length frames, generating a capsule comprised of each of the fixed-length frames, a CRC field for detecting whether or not the data sent from the each client terminal is normal, a type field for notifying a fault occurring on a client line, a forward relay line fault notification field for notifying a fault occurring in a transmission network in a forward direction, and a backward relay line fault notification field for notifying the fault in a backward direction, multiplexing the capsules in a predefined order and adding an FCS field for detecting whether or not data in the capsules is normal to generate a multiplexed MAC frame, and sending the multiplexed MAC frame; and an egress node for detecting a defective data reception for each Ethernet path from the result of checking the CRC field added to the fixed-length frame, detecting a relay line fault in the forward direction and in the backward direction for each Ethernet path from information in the type field, the forward relay line fault notification field, and the backward relay line fault notification field, identifying an alarm for a path network layer from the detected defective data reception and the relay line fault information, detecting a defective data reception for each line from the result of checking the FCS field added to the multiplexed MAC frame, and detecting loss of signal and link-down for each line to identify an alarm for a transmission medium network layer.

The wide area Ethernet network may further comprises a relay node for relaying the multiplexed MAC frame transmitted/received between the ingress node and the egress node by multiplexing frames defined by SONET/SDH into the multiplexed MAC frame or demultiplexing the multiplexed MAC frame into the SONET/SDH defined frames, identifying an alarm on a path-by-path basis from a POH byte defined by the SONET/SDH, and identifying an alarm on a section-by-section basis from an SOH byte defined by the SONET/SDH.

In the wide area Ethernet networks as described above, the transmission medium network layer is monitored for a fault based on the result of a CRC operation using the FCS field in the multiplexed MAC frame, and the path network layer is monitored for a fault based on the result of a CRC operation on a CRC field in a GBP capsule of each Ethernet path, so that the section and path can be managed independently of each other as in the SONET/SDH network, and therefore, a transmission network can be organized in a layered structure comprised of a transmission medium network layer and a path network layer. Consequently, according to the present invention, even in a wide area Ethernet network which applies GBP encapsulation, in which an Ethernet network is used as a transmission network for a relay section, the designing, maintenance, and operation of the network can be managed in a layered structure, thereby providing advanced network services, as is the case with a wide area Ethernet network which employs a SONET/SDH network in a relay section.

In a wide area Ethernet network in which a transmission network in a relay section is implemented by a combination of an Ethernet network and a SONET/SDH network such that the SONET/SDH network is utilized as a transmission network in a certain section, while the GbE network is utilized as a transmission network in another section, transmission medium network layers corresponding to respective sections can be managed irrespective of the type of the transmission networks, and the GBP capsule of the wide area Ethernet network can be used to manage a path network layer from an ingress node to an egress node on an end-to-end basis. Thus, according to the present invention, even a wide area Ethernet network, which includes a combination of a plurality of transmission networks, can be designed, operated, and maintained without awareness of the difference between the transmission networks, thereby providing advanced network services. Further, in such a configuration, it is possible to reduce the circuit scale and mounting area of a relay node which corresponds to a connection of a SONET/SDH network with an Ethernet network. This is because the respective Ethernet networks are provided with the same switching means as that use in the SONET/SDH network to share the APS (automatic protection switching) processing circuit provided for the SONET/SDH network. When a single APS processing circuit can be shared for the SONET/SDH and Ethernet networks, the relay node can be reduced in circuit scale and mounting area.

Further, in the present invention, the APS processing can be performed as fast as in the SONET/SDH network by using the K1 byte and K2 byte and applying similar APS processing to that used in the SONET/SDH network in a section in which the Ethernet is used as a transmission network.

The above and other objects, features, and advantages of the present invention will become apparent from the following description with reference to the accompanying drawings which illustrate examples of the present invention.

BRIEF DESCRIPTION OF THE DRAWINGS

FIG. 15 is a table showing exemplary classifications for operations of an alarm processing circuit contained in the FE multiplexer illustrated in FIG. 14;

FIG. 18 is a table showing exemplary classifications for operations of an alarm processing circuit contained in the GbE multiplexer illustrated in FIG. 17.

DETAILED DESCRIPTION OF THE INVENTION

First Embodiment

The present invention employs GBP (Generic Blocking Procedure) for protocol conversion between the Ethernet and SONET/SDH. Details of the GBP is described in Japanese Patent Application No. 2002-374791 (JP, P2002-374791) filed on Dec. 25, 2002 which corresponds to U.S. Ser. No. 10/743,375 filed on Dec. 23, 2003 and owned by the assignee of this application. The disclosure of U.S. Ser. No. 10/743,375 is incorporated herein by reference.

Figure 1:
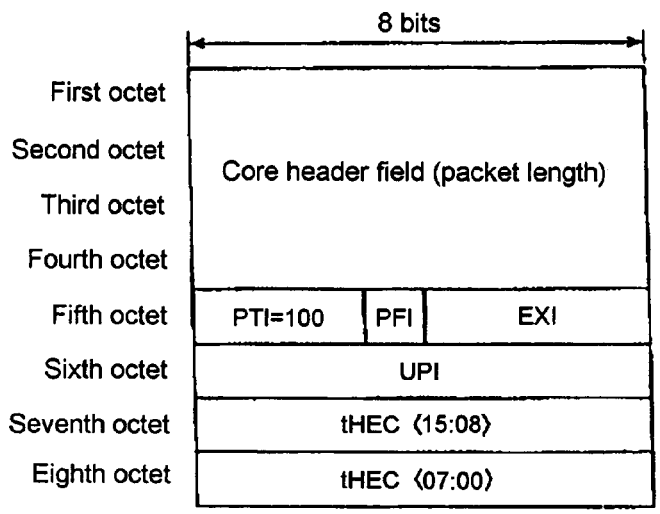
FIG. 1 is a diagram showing a format for a client management frame defined in the GFP.
Figure 2:
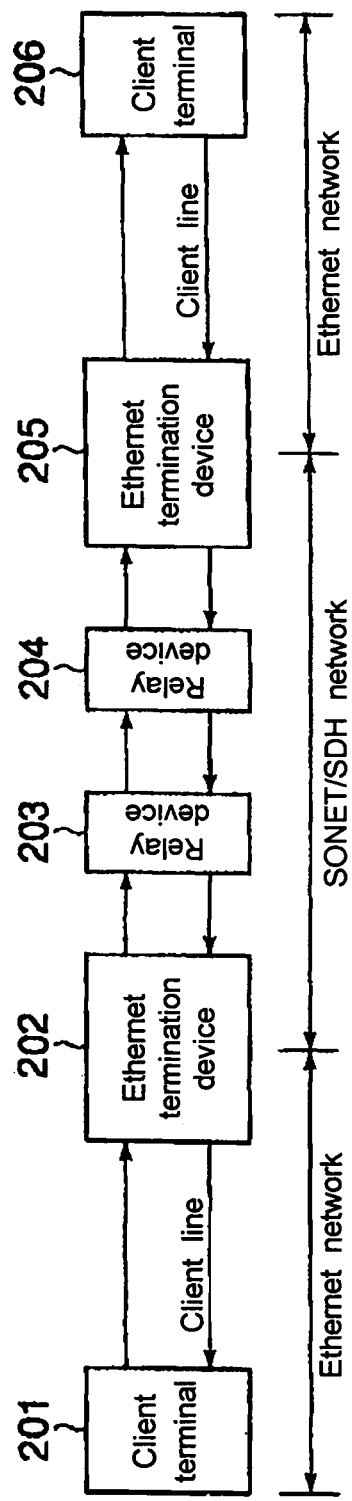
FIG. 2 is a block diagram illustrating an exemplary configuration of a conventional expanded Ethernet network.
Figure 3:
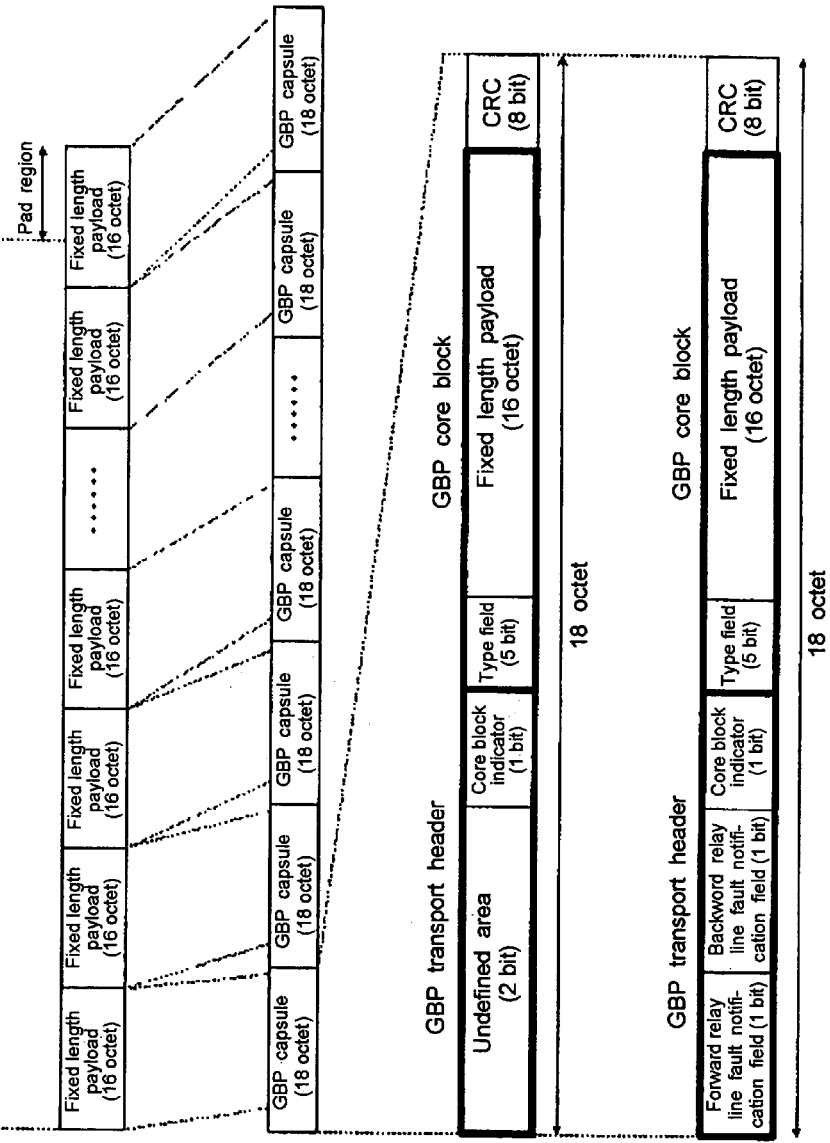
FIGS. 3A to 3E are diagrams showing a format for a frame defined by GBP (Generic Blocking Procedure)

FIGS. 3A to 3E show a format for a frame defined by the GBP. According to the GBP, an Ethernet frame as shown in FIG. 3A is divided into fixed length payloads each having 16 octets from the top (see FIG. 3B). The Ethernet frame has a variable length which is not always an integer multiple of 16 octets. For this reason, the last fixed length payload may include an extra pad region comprised of a predetermined consistent data pattern, if the payload has less than 16 octets, for filling the remaining free space. Then, a header field and the like is added to each of the fixed length payloads to generate a GBP capsule of 18 octets long, as shown in FIG. 3C.

The structure of the GBP capsule is shown in FIGS. 3D and 3E. Specifically, FIG. 3D shows a frame format in a normal operation, and FIG. 3E shows a frame format when a fault occurs on a relay line. As shown in FIGS. 3D and 3E, the GBP capsule has a GBP transport header, a GBP core block, and an 8-bit CRC (Cyclic Redundancy Check) field. The CRC operation is performed for both the GBP transport header and GBP core block.

The GBP core block has a 5-bit type field in front of the fixed length payload. The type field is defined for control, such that a value in this field is relied on to notify a fault on a client line, as is the case with the aforementioned GFP.

The GBP transport header is a 3-bit field comprised of a 2-bit undefined area and a 1-bit GBP core block indicator field. However, as shown in FIG. 3E, when a fault occurs on a relay line, the undefined area is replaced with a 1-bit forward relay line fault notification field and a 1-bit backward relay line fault notification field.

The GBP core block indicator field stores a value indicating whether the subsequent GBP core block is valid or invalid, where "1" indicates that the GBP core block is valid, and "0" indicates that the GBP core block is invalid (idle). The core block indicator field is set to "0" in response to a detection of the forward relay line fault notification, later described.

The forward relay line fault notification field is used to notify the presence or absence of a fault on a relay line in the forward direction, while the backward relay line fault notification field is used to notify the presence or absence of a fault on a relay line in the backward direction.

FIGS. 4A to 4C show, by way of example, how Ethernet paths (client lines) having the number m of lines (m is an arbitrary positive integer), encapsulated by GBP are multiplexed on a single relay GbE line. The multiplexed client lines are assumed to be m fast Ethernet (hereinafter abbreviated as "FE") lines.

As shown in FIGS. 4A and 4B, GBP capsules for m lines are sequentially time-division-multiplexed on a relay GbE line, and the time-division-multiplexing is repeated k times (k is an arbitrary positive integer) to generate one frame. Here, k is a value determined by the relationship between the transmission rate on the GbE line and the transmission rate on the client line. While FIG. 4A only describes an Ethernet frame transferred on a single client line (Ethernet path #1), Ethernet frames are actually transferred on m client lines (Ethernet paths #1-#m), so that GBP capsules are extracted in order from the first one in each of the Ethernet frames for time division multiplexing on a relay GbE line.

Also, as shown in FIG. 4C, a multiplexed MAC frame header is added in front of the first GBP capsule after the multiplexing. The multiplexed MAC frame header is comprised of a sequence number storing field (of two octets long); a K1 byte storing field (of one octet long); a K2 byte storing field (of one octet long); a reserved field (of eight octets long); and an HEC (Header Error Control) field (of two octets long).

Further, a header (MAC frame header) including a destination address, a source address, priority information, and the like is added in front of the multiplexed MAC frame header, and an FCS field is added to the end of the frame. The resulting frame is called the "multiplexed MAC frame."

Figure 4:
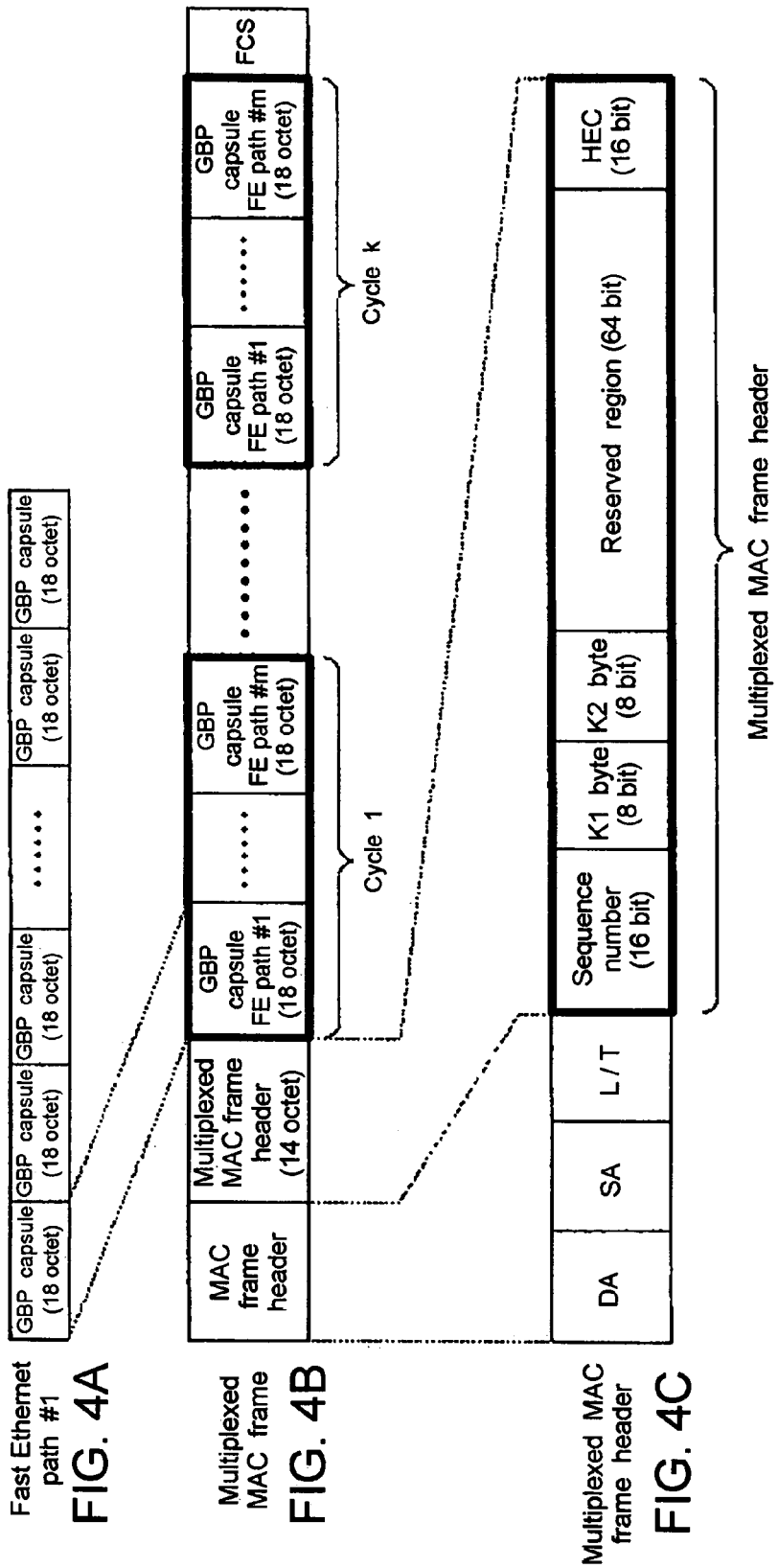
FIGS. 4A to 4C are schematic diagrams showing by way of example how Ethernet frames for a number of lines m encapsulated by the GBP are multiplexed on a single frame for a GbE line.
Figure 5:
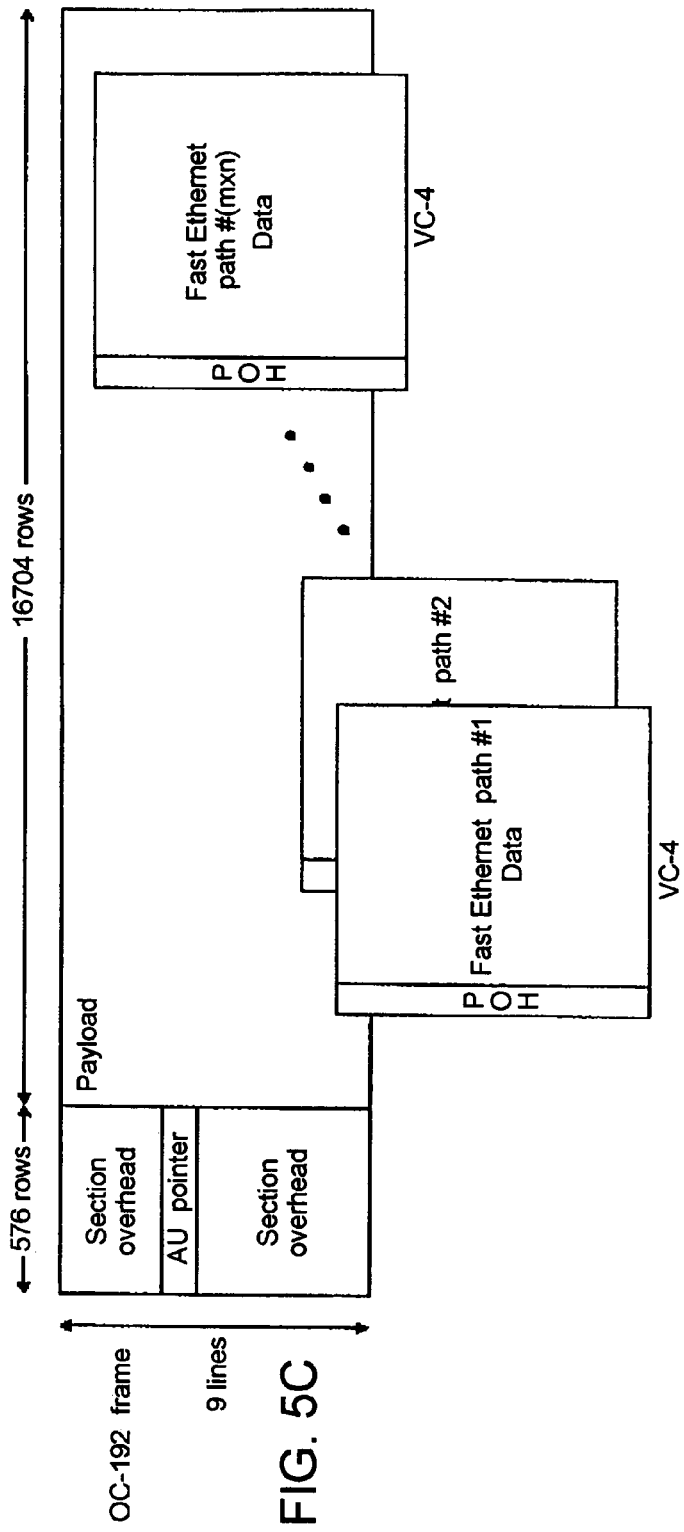
FIGS. 5A to 5C are diagrams showing by way of example how n multiplexed MAC frames shown in FIGS. 4A to 4C are multiplexed on a single frame for a SONET/SDH line.

FIGS. 5A to 5C show by way of example how n multiplexed MAC frames shown in FIGS. 4A to 4C are multiplexed on a single frame for a SONET/SDH line. Specifically, FIGS. 5A to 5C show an example in which n multiplexed MAC frames are separated into m×n GBP capsules, and the separated m×n Ethernet frames (i.e., GBP capsules) are multiplexes on a single SONET/SDH line.

As shown in FIGS. 5A to 5C, in the SONET/SDH network, one Ethernet path on an FE line is assigned to one VC-4 (155.52 Mbps) frame, which is a path defined by SONET/SDH, and the VC-4 frame stores data on the Ethernet path in its payload.

On the other hand, when a client line is a GbE line, an Ethernet path on one GbE line is assigned to VC-4 frames for eight channels, and the VC-4 frames for eight channels store data on the Ethernet path in their payloads. One GbE line can be stored in payloads of a plurality of channels, for example, by applying the virtual concatenation described on page 108 of ITU-T Recommendation G.707 (October 2000). While the foregoing example provides the VC-4 frames for eight channels, this is a mere example, and the VC-4 frames for any number of channels may be provided as long as they are equal to or more than the bandwidth of the GBP encapsulated GbE line. Alternatively, a plurality of VC-3 frames may be used instead.

The virtual concatenation may also be used in the aforementioned transfer of the Ethernet path on the FE line, in which case an Ethernet path on one FE line may be assigned to VC-3 frames for a plurality of channels, and the VC-3 frames for the plurality of channels may store data on the Ethernet path in their payloads.

The Ethernet frame (GBP capsule. See FIG. 5A) of 18 octets long transferred along an Ethernet path is delimited every octet, and stored in a payload of an OC-192 frame defined by SONET/SDH in units of VC-4 (for each Ethernet path), as shown in FIG. 5C. In this event, idle blocks are inserted and extracted for compensating for the difference between the line rate of the VC-4 frames and the line rate of the GBP capsules.

A section overhead of the OC-192 frame shown in FIG. 5C stores network management information such as frame synchronization, error monitoring, alarm transfer, and the like, and an AU pointer stores information for indicating the head position of a VC-4 frame. The VC-4 frame has a POH (Path Over Head) field which stores an error monitoring alarm. These fields are all defined by SONET/SDH.

Figure 6:
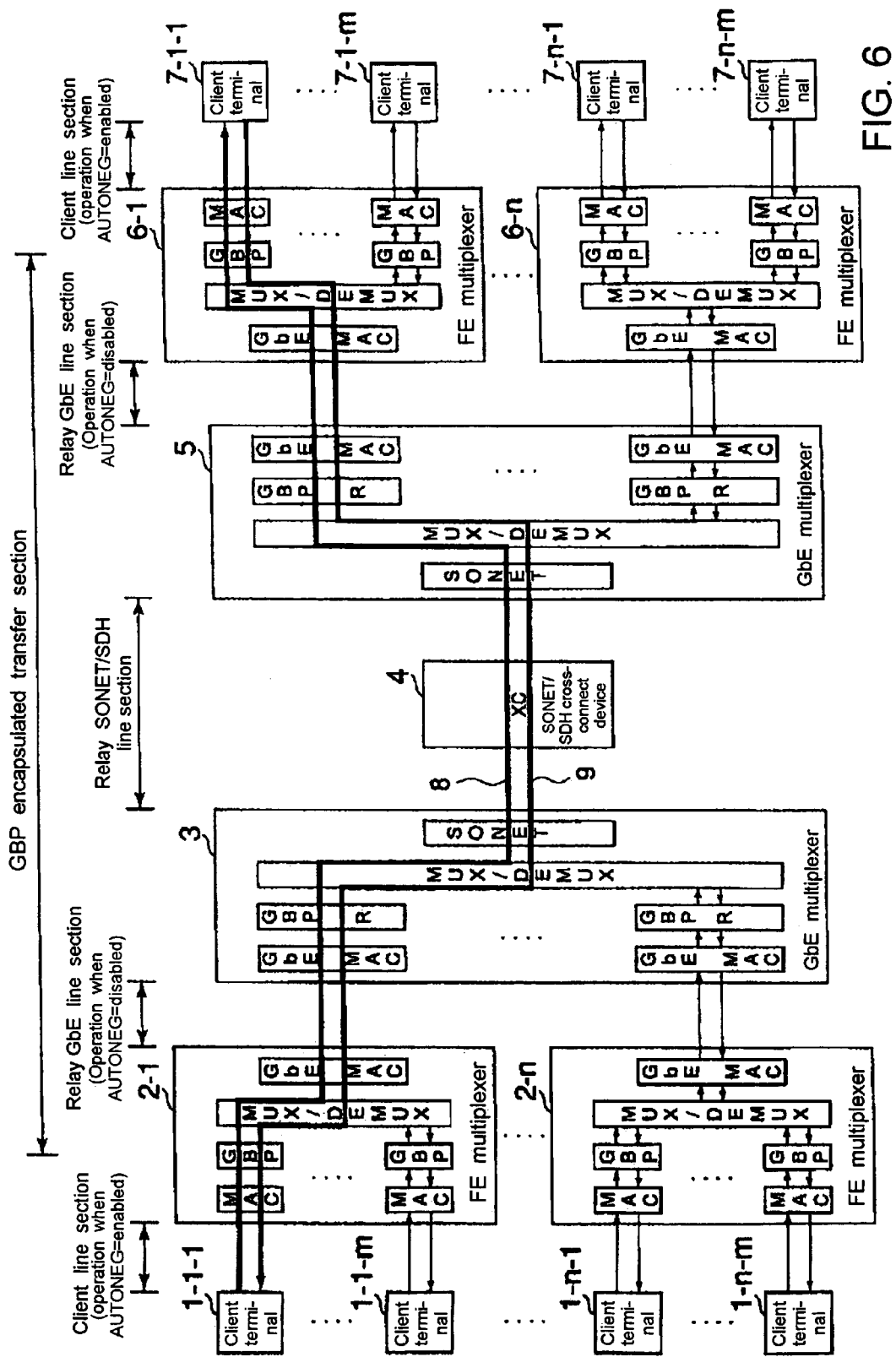
FIG. 6 is a block diagram illustrating an exemplary configuration of a wide area Ethernet network to which an alarm transfer method according to the present invention is applied.
Figure 7:
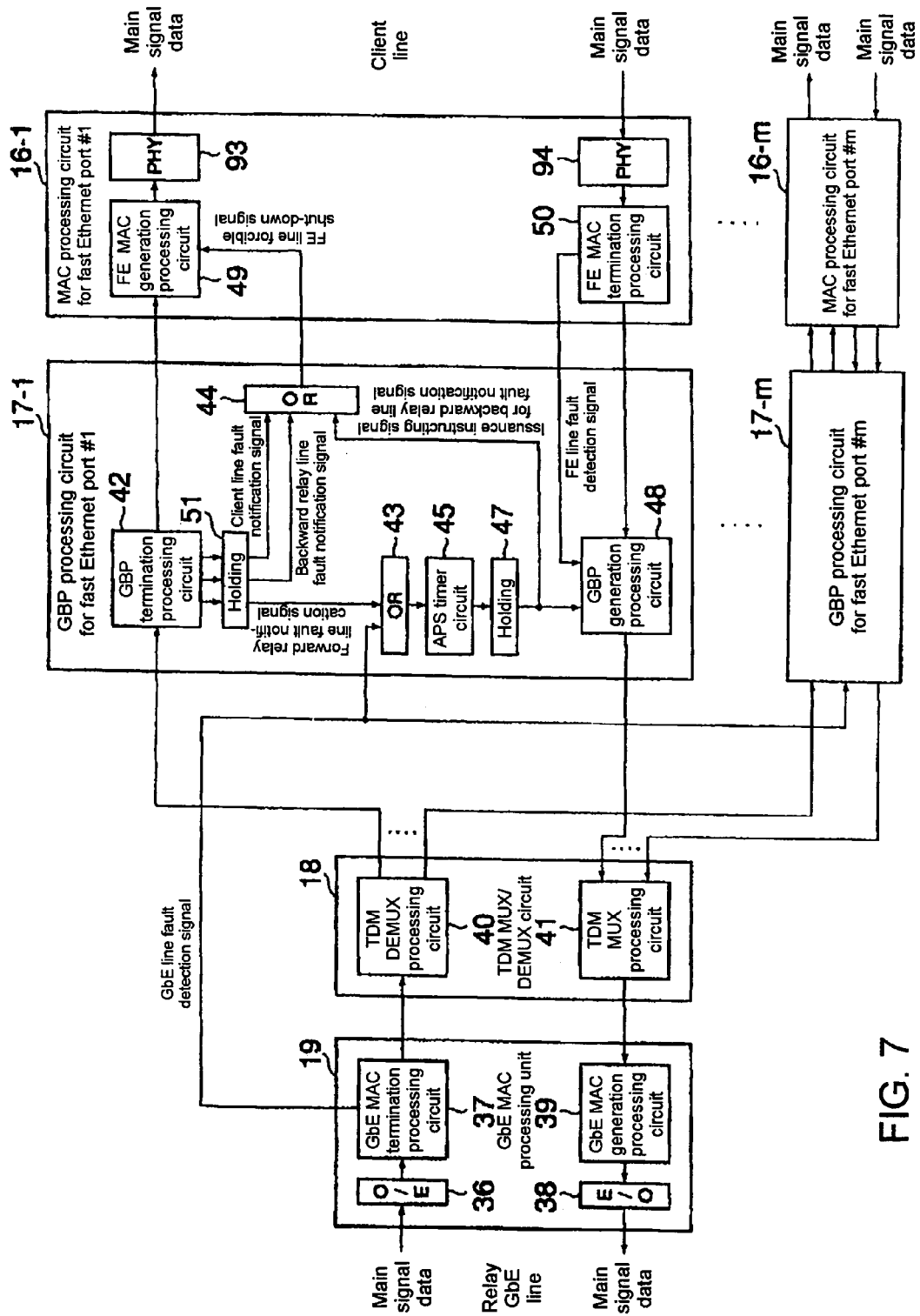
FIG. 7 is a block diagram illustrating the configuration of an FE multiplexer shown in FIG. 6.
Figure 8:
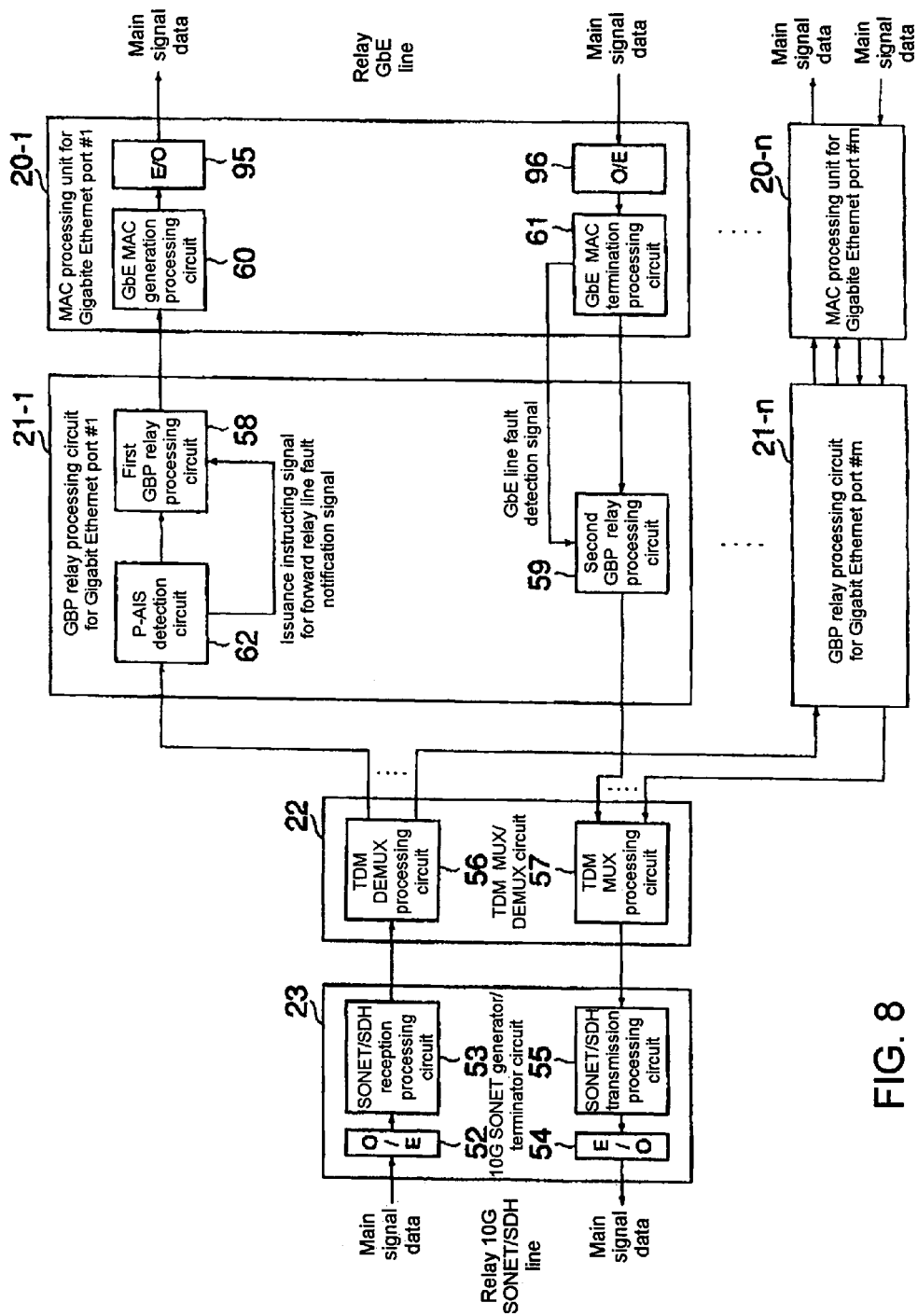
FIG. 8 is a block diagram illustrating the configuration of a GbE multiplexer shown in FIG. 6.

Next, description will be made on a wide area Ethernet network to which an alarm transfer method is applied in accordance with the first embodiment. FIG. 6 illustrates the configuration of a wide area Ethernet network to which the alarm transfer method is applied in accordance with the first embodiment. FIG. 7 illustrates the configuration of an FE multiplexer shown in FIG. 6, and FIG. 8 illustrates the configuration of a GbE multiplexer shown in FIG. 6.

In the first embodiment, an alarm is transferred upon occurrence of a fault using the type field in the GBP core block for transferring a fault occurring on a client line. In addition, the alarm transfer employs the forward relay line fault notification field and backward relay line fault notification field provided in the GBP transport header. Then, upon detection of a fault on an upstream line at a relay node, a forward relay line fault notification is issued to all Ethernet paths which pass the line on which the fault has occurred. Also, from an egress node, which has received the forward relay line fault notification, to an upstream ingress node, a backward relay line fault notification is issued only to those Ethernet paths which have received the forward relay line fault notification. In this event, if the forward relay line fault notification is still received even after the lapse of an arbitrary protection time, set by an APS timer circuit, later described, the backward relay line fault notification is issued. Upon receipt of the backward relay line fault notification, the ingress node forcefully brings the client line associated with the Ethernet path into link-down.

As illustrated in FIG. 6, the wide area Ethernet network in the first embodiment comprises a plurality of Ethernet networks (two in FIG. 6), each of which accommodate a plurality of client terminals, which are connected through GbE networks and a SONET/SDH network. The Ethernet networks used herein may be FE networks which provide the transmission capability of 10 Mbps or 100 Mbps. The SONET/SDH network used herein may be 10G SONET/SDH network which has the transmission capability of 9.953 Gbps per port.

Client terminals 1-1-1 to 1-n-m accommodated in one FE network shown in FIG. 6 are connected to FE multiplexers 2-1 to 2-n, which are edge nodes, respectively, while client terminals 7-1-1 to 7-n-m accommodated in the other FE network are connected to FE multiplexers 6-1 to 6-n, which are edge nodes, respectively. Client terminals 1-1-1 to 1-n-m are identical in configuration to client terminals 7-1-1 to 7-n-m, though they are installed at locations opposite to each other across the relay lines. Each of the client terminals may be an Ethernet switch such as a hub.

GbE multiplexer 3 is a relay device in a GbE network which accommodates lines directed to FE multiplexers 2-1 to 2-n, while GbE multiplexer 5 is a relay device in a GbE network which accommodates lines directed to FE multiplexers 6-1 to 6-n. GbE multiplexer 3 is identical in configuration to GbE multiplexer 5, though they are installed at locations opposite to each other across the relay line. SONET/SDH cross-connect (XC) device 4 is a relay device in the SONET/SDH network for relaying GbE multiplexer 3 to GbE multiplexer 5 and vice versa.

In the following description, each line or circuit which connects a client terminal to an FE multiplexer shown in FIG. 6 is called the "client line," and a line or circuit which connects an FE multiplexer to a GbE multiplexer is called the "relay GbE line." Also, a line or circuit which connects a GbE multiplexer to the SONET/SDH cross-connect device is called the "relay SONET/SDH line."

Here, the client line section is operated with an auto-negotiation (AUTONEG) function, defined by the Ethernet, being set enabled. The auto negotiation function may be set disabled in a certain network configuration. The relay GbE line section is operated with the auto-negotiation function being set disabled.

The auto-negotiation function involves mutually communicating information between devices interconnected through an Ethernet line to set an optimal communication mode (transmission rate, full duplex/half duplex), and communicating line fault information to set a backward line to link-down when a fault occurs on a forward line. Information for the auto-negotiation function may be communicated by an FLP (Fast Link Pulse) on the FE network.

SONET/SDH cross-connect device 4 is provided for switching transmission paths of frames, used in the 10G SONET/SDH network.

FE multiplexers 2-1 to 2-n, and 6-1 to 6-n each time-division-multiplex m FE frames on a single GbE frame, and also demultiplex one GbE frame into m FE frames. For example, FE multiplexer 2-1 transforms FE frames transmitted from client terminals 1-1-1 to 1-1-m into GBP capsules, and time-division-multiplexes the GBP capsules for one GbE line to generate a multiplexed MAC frame. FE multiplexer 2-1 also demultiplexes a GbE frame received from one GbE line into m FE frames.

GbE multiplexer 3 accommodates GbE lines from FE multiplexers 2-1 to 2-n, and time-division-multiplexes frames received from n GbE lines on a single 10G SONET/SDH line. GbE multiplexer 3 also demultiplexes a SONET/SDH frame received from the 10G SONET/SDH line into n GbE frames.

The number m of multiplexing provided by respective FE multiplexers 2-1 to 2-n, and 6-1 to 6-n is set, for example, to a positive integer equal to or less than eight from the relationship between the capacity of the GbE line and an FE frame transfer band. Also, the number n of multiplexing provided by the respective GbE multiplexers is also set to a positive integer equal to or less than eight for the same reason.

For making a communication between client terminals opposing each other across the relay lines in the wide area Ethernet network illustrated in FIG. 6, as a source client terminal and a destination client terminal are determined, multiplexing/demultiplexing orders are determined in associated FE multiplexers and GbE multiplexers in accordance with a transmission path which interconnects these client terminals, and a switching path is determined in the SONET/SDH cross-connect device. By thus determining line settings in each node in accordance with the source client terminal and destination client terminal, Ethernet frames sent from an arbitrary client terminal are transferred only to the determined client terminal. A fixed transmission path built by the line settings for transmitting Ethernet frames is called the "Ethernet path." Here, such a transmission path is called the "FE path" when a client line is an FE line, and is called the "GbE path" when a client line is a GbE path.

FIG. 6 illustrates an example in which FE paths are set between client terminal 1-1-1 and client terminal 7-1-1, wherein FE path 8 is an Ethernet path which defines the forward direction from client terminal 1-1-1 to client terminal 7-1-1, and FE path 9 is an Ethernet path in the backward direction with respect to FE path 8, and is also an Ethernet path which defines the forward direction from client terminal 7-1-1 to client terminal 1-1-1.

As illustrated in FIG. 7, FE multiplexers 2-1 to 2-n and 6-1 to 6-n each comprise GbE MAC processing unit 19 for performing MAC processing such as transmission/reception of frames, detection of a line fault, and the like for the associated relay GbE line; TDM MUX/DEMUX circuit 18 for time-division-multiplexing. or demultiplexing frames transmitted in the forward direction or in the backward direction in a predefined order; GBP processing circuits 17-1 to 17-m each for generating and terminating GBP capsules for each FE path and having an alarm transfer function; and MAC processing circuits 16-1 to 16-m each for performing MAC processing such as transmission/reception of frames, detection of a line fault, and the like for the associated client line.

GbE MAC processing unit 19 comprises O/E circuit 36 for converting a received optical signal to an electric signal; GbE MAC termination processing circuit 37 for detecting reception of an FE frame, and a fault on a relay GbE line; E/O circuit 38 for converting an electric signal to an optical signal which is sent out therefrom; and GbE MAC generation processing circuit 39 for generating GbE frames.

TDM MUX/DEMUX circuit 18 comprises TDM DEMUX processing circuit 30 for demultiplexing a received frame in accordance with a predefined order; and TDM MUX processing circuit 41 for time-division-multiplexing frames in a predefined order.

GBP processing circuits 17-1 to 17-m each comprise GBP termination processing circuit 42; holding circuit 51 for holding a client line fault notification, a forward relay line fault notification, and a backward relay line fault notification delivered from GBP termination processing circuit 42 for a fixed time period; OR circuit 43 for taking logical OR of the forward relay line fault notification and a GbE line fault detection signal delivered from MAC processing unit 19;

APS timer circuit 45 triggered by an output signal of OR circuit 43 to start counting and count up to $T_{APS}$ [ms] (approximately 50 milliseconds) while the output signal remains at "1"; holding circuit 47 for holding the output signal of OR circuit 43 at "1" (signal for instructing issuance of a backward relay line fault notification) until the output signal of OR circuit 43 transitions to "0" after APS timer circuit 45 has counted up to $T_{APS}$ [ms]; OR circuit 44 for taking logical OR of the output signal of holding circuit 47 and the client line fault notification and backward relay line fault notification delivered from holding circuit 51; and GBP generation processing circuit 48 for generating GBP capsules and an alarm for a client line fault.

APS timer circuit 45 counts a protection time required for switching a transmission path in order to provide redundancy for a relay line which interconnects client terminals. If the forward relay line fault notification is still being received even after the lapse of time $T_{APS}$ defined by APS timer circuit 45, a transmission path of a relay line is switched.

FE MAC processing circuits 16-1 to 16-n each comprise FE MAC generation processing circuit 49 for generating FE frames; physical device 93 for transmitting FE frames; physical device 94 for receiving FE frames from an associated FE line; and FE MAC termination processing circuit 50 for receiving an FE frame and detecting a client line fault.

As illustrated in FIG. 8, GbE multiplexers 3, 5 each comprise 10G SONET generator/terminator circuit 23 for transmitting/receiving frames to/from the SONET/SDH line and detecting a line fault on the SONET/SDH line; TDM MUX/DEMUX circuit 22 for time-division-multiplexing or demultiplexing frames to be transmitted in the upstream direction or in the downstream direction in a predefined order; GBP relay processing circuits 21-1 to 21-n each for performing operations associated with relay processing such as a rate adjustment of the GBP capsule for each GbE path, and having an alarm transfer function; and GbE MAC processing units 20-1 to 20-n each for performing MAC processing such as transmission/reception of frames to/from a GbE line, detection of a line fault, and the like.

10G SONET generator/terminator circuit 23 comprises an O/E circuit 52 for converting a received optical signal to an electric signal; SONET/SDH reception processing circuit 53 for detecting reception of a SONET/SDH frame and a fault on the SONET/SDH line; E/O circuit 54 for converting an electric signal to an optical signal which is sent out therefrom; and SONET/SDH transmission processing circuit 55 for generating SONET/SDH frames.

TDM MUX/DEMUX circuit 22 comprises TDM DEMUX processing circuit 56 for demultiplexing a received frame in accordance with a predefined order; and TDM MUX processing circuit 57 for time-division-multiplexing data in a predefined order.

GBP relay processing circuits 21-1 to 21-n each comprise P-AIS detector circuit 62 for detecting path AIS in a VC-4 frame for each FE path; first GBP relay processing circuit 58 for relaying from VC-4 to GbE; and second GBP relay processing circuit 59 for relaying from GbE to VC-4.

GbE MAC processing units 20-1 to 20-n each comprise GbE MAC generation processing circuit 60 for generating GbE frames; E/O circuit 95 for transmitting generated GbE frames; O/E circuit 96 for receiving frames from a GbE line; and GbE MAC termination processing circuit 61 for receiving a GbE frame and detecting a fault on a GbE line.

It should be noted that "MAC" within FE multiplexers 2-1 to 2-n and 6-1 to 6-n shown in FIG. 6 corresponds to FE MAC processing circuits 16-1 to 16-n shown in FIG. 7, and "GBP" corresponds to GBP processing circuits 17-1 to 17-n shown in FIG. 7. Also, "MUX/DEMUX" corresponds to TDM MUX/DEMUX circuit 18 shown in FIG. 7, and "GbE MAC" corresponds to GbE MAC processing unit 19 shown in FIG. 7.

"GbE MAC" within GbE multiplexers 3, 5 shown in FIG. 6 corresponds to GbE MAC processing units 20-1 to 20-n shown in FIG. 8, "GBP R" corresponds to GBP relay processing circuits 21-1 to 21-n shown in FIG. 8. Also, "MUX/DEMUX" corresponds to TDM MUX/DEMUX circuit 22 shown in FIG. 8, and "SONET" corresponds to 10G SONET generator/terminator circuit 23 shown in FIG. 8.

Description will be next made on the operation of the FE multiplexers and GbE multiplexers during an alarm transfer.

First, the operation of FE multiplexers 2-1 to 2-n and 6-1 to 6-n will be described with reference to FIG. 7.

In each of FE multiplexers 2-1 to 2-n and 6-1 to 6-n, O/E circuit 36 converts main signal data (GbE frames) received from a relay GbE line to an electric signal, and GbE MAC termination processing circuit 37 performs MAC termination processing such as removal of a preamble, FCS checking, and the like.

The MAC termination processing also includes detection of link-down. Upon detection of link-down, MAC termination processing circuit 37 applies all GBP processing circuits 17-1 to 17-m with a GbE line fault detection signal at "1." The GbE line fault detection signal is continuously delivered while link-down is being detected. MAC termination processing circuit 37 delivers the GbE line fault detection signal at "0" at the time of link up.

The frames delivered from GbE MAC termination processing circuit 37 is the aforementioned multiplexed MAC frame which is applied to TDM DEMUX processing circuit 40.

TDM DEMUX processing circuit 40 demultiplexes the frame for each FE path in accordance with a predefined order, and applies data demultiplexed from the frame to GBP processing circuits 17-1 to 17-m which are associated with defined FE ports (#1-#m).

Now, description will be made on the operation of GBP processing circuits 17-1 to 17-m.

A frame applied to GBP termination processing circuit 42 in each of GBP processing circuits 17-1 to 17-m is a FE frame corresponding to one FE path. GBP termination processing circuit 42 terminates the frame to extract a GBP capsule. Then, GBP termination processing circuit 42 examines the type field in the GBP core block and the contents of the GBP transport header in the extracted GBP capsule to detect a client line fault notification, a forward relay line fault notification, or a backward relay line fault notification which is delivered to holding circuit 51. Holding circuit 51 holds the value of each line fault notification until the next GBP transport header is received.

OR circuit 43 takes logical OR of the held forward relay line fault notification, and a GbE line fault detection signal delivered from GbE MAC termination processing circuit 37, and delivers the result of the logical OR operation. When OR circuit 43 delivers the value of "1," this indicates that a relay line fault has occurred on a FE path on which the forward direction is defined from a relay GbE line to a client line.

APS timer circuit 45 is triggered by a transition of the output value of the OR circuit 43 from "0" to "1" to start counting up. Then, APS timer circuit 45 continues to count up when OR circuit 43 applies the value of "1" to APS timer circuit 45, and applies a signal "1" to holding circuit 47 after it has counted up to maximum $T_{APS}$ [ms]. APS timer circuit 45 resets the counted value to an initial value "0" when OR circuit 43 applies the value of "0" to APS timer circuit 45.

Holding circuit 47 holds the output at "1" until the output of OR circuit 43 transitions to "0" when APS timer circuit 45 delivers the value of "1."

OR circuit 44 takes logical OR of the output signal of holding circuit 47 and the client line fault notification and backward relay line fault notification delivered from holding circuit 51, and sends the result of the OR operation to FE MAC generation processing circuit 49 as an FE line forcible shut-down signal.

FE MAC generation processing circuit 49 performs MAC processing on an FE frame delivered from GBP termination processing circuit 42 such as addition of a preamble, and the like. The FE frame thus generated is sent onto a client line from physical device 93.

Upon detection of the FE line forcible shut-down signal at "1" delivered from OR circuit 44, FE MAC generation processing circuit 49 stops delivering main signal data, and forcefully brings the client line into link-down.

In this way, upon detection of a client line fault notification or a backward relay line fault notification, a downstream client line is immediately set into link-down in a forcible manner. Upon detection of a forward relay line fault notification, on the other hand, a client line downstream of the FE path is forcefully set into link-down after the lapse of protection time $T_{APS}$ set in APS timer 45 to accomplish the link-pass-through for the downstream client line.

On the other hand, in each of FE multiplexers 2-1 to 2-n and 6-1 to 6-n, receives main signal data (FE frame) at physical device 94 from an associated client line, FE MAC termination processing circuit 50 performs MAC termination processing on the received data such as removal of the preamble, FCS checking, and the like. FE MAC termination processing circuit 50 also detects link-down of a client line, and upon detection of link-down, continuously delivers an FE line fault detection signal at "1" to GBP generation processing circuit 48.

GBP generation processing circuit 48 generates a GBP capsule of 18 octets long from the FE frame applied thereto. In this event, GBP generation processing circuit 48 references the FE line fault detection signal and the backward relay line fault notification issuance instruction signal delivered from holding circuit 47, and sets a code ("0") indicative of the absence of a line fault in the backward rely line fault notification field in the GBP capsule, and sets a code indicative of the absence of a line fault in the type field in the GBP capsule when the FE line fault detection signal is at "0" and the backward relay line fault notification issuance instruction signal is at "0." In this event, the fixed-length payload field in the GBP core block is not overwritten, and is passed through GBP generation processing circuit 48 as it is.

When the FE line fault detection signal is at "1" and the backward relay line fault notification issuance instruction signal is at "0," GBP generation processing circuit 48 sets the code ("0") indicative of the absence of a line fault in the backward relay line fault notification field in the GBP capsule, and sets a code indicative of the presence of a client line fault in the type field in the GBP capsule. In this event, the fixed-length payload field in the GBP core block is overwritten with a predefined fixed pattern (a pattern entirely composed of "1" or the like).

When the FE line fault detection signal is at "0" and the backward relay line fault notification issuance instruction signal is at "1," GBP generation processing circuit 48 sets a code ("0") indicative of the absence of a line fault in the forward relay line fault notification field in the GBP capsule, sets a code ("1") indicative of the presence of a line fault in the backward relay line fault notification field, and sets a code indicative of no client line fault in the type field. In this event, the fixed-length payload field in the GBP core block is not overwritten, and is passed through GBP generation processing circuit 48 as it is.

When the FE line fault detection signal is at "1" and the backward relay line fault notification issuance instruction signal is at "1," GBP generation processing circuit 48 sets the code ("0") indicative of the absence of a line fault in the forward relay line fault notification field in the GBP capsule, sets the code ("1") indicative of the presence of a line fault in the backward relay line fault notification field, and sets the code indicative of no client line fault in the type field. In this event, the fixed-length payload field in the GBP core block is overwritten with a predefined fixed pattern (a pattern entirely composed of "1" or the like).

The GBP capsule thus generated is applied to TDM MUX processing circuit 41 which time-division-multiplexes the GBP capsule with GBP capsules of other FE paths, as shown in FIG. 4. Then, GbE MAC generation processing circuit 39 adds a preamble signal and FCS to the multiplexed GBP capsules, and delivers the resulting multiplexed MAC frame onto a relay GbE line through E/O circuit 38.

Next, the operation of GbE multiplexers 3, 5 will be described with reference to FIG. 8.

As illustrated in FIG. 8, in each of GbE multiplexers 3, 5, O/E circuit 52 converts main signal data (SONET/SDH frame) received from a 10G SONET/SDH line to an electric signal, and SONET/SDH reception processing circuit 53 executes the termination processing on the section overhead (SOH) and path overhead (POH). In this event, upon detection of a path alarm defined by SONET/SDH, SONET/SDH reception processing circuit 53 issues a path AIS alarm to a corresponding VC-4 frame, and overwrites its payload field entirely with "1." Upon detection of a section alarm, SONET/SDH reception processing circuit 53 issues a path AIS alarm to all VC-4 frames which pass through the 10G SONET/SDH line, and overwrites their payload fields entirely with "1." The path AIS alarm is continuously issued while the path alarm or section alarm is being detected.

A frame delivered from SONET/SDH reception processing circuit 53 is a VC-4×64 (OC-192) which is applied to TDM DEMUX processing circuit 56. TDM DEMUX processing circuit 46 demultiplexes an OC-192 frame in units of VC-4 (FE path) in accordance with a predefined order, and delivers the resulting data to associated GBP relay processing circuits 21-2 to 21-n, respectively, for corresponding GbE paths.

Next, description will be made on the operation of GBP relay processing circuits 21-1 to 21-n.

In each of GBP relay processing circuits 21-1 to 21-n, P-AIS detector circuit 62 checks whether or not the payload field in a received frame is fully filled with "1" in units of VC-4, and determines that a path AIS alarm has been issued for the VC-4 when the payload field is fully filled with "1," and delivers a forward relay line fault notification issuance instruction signal at "1." On the other hand, when the payload field is not fully filled with "1," P-AIS detector circuit 62 delivers the forward relay line fault notification issuance instruction signal at "0."

First GBP relay processing circuit 48 extracts GBP capsules from the main signal data (VC-4×m) received thereby, and applies the rate on the GbE line to the extracted GBP capsules. In this event, for adjusting the difference in rate between the m VC-4 frames and the GbE line, first GBP relay processing circuit 58 thins out idle frames from the VC-4 frames.

When the forward relay line fault notification issuance instruction signal is at "1," first GBP relay processing circuit 58 sets a code ("1") indicative of the presence of a line fault in the forward relay line fault notification field in the GBP transport header of the associated FE path. While first GBP relay processing circuit 58 allows the fixed-length payload field in the GBP core block to pass therethrough as it is, the payload field has been entirely overwritten with "1" by SONET/SDH reception processing circuit 53, so that no data is transferred in the downstream direction. In other words, the occurrence of a forward relay line fault is detected on the FE path on which the forward direction is defined from the relay 10G SONET/SDH line to the relay GbE line.

When the forward relay line fault notification issuance instruction signal is at "0," first GBP relay processing circuit 58 allows the forward relay line fault notification field to pass therethrough as it is. First GBP relay processing circuit 38 also allows the backward relay line fault notification field, the type field in the GBP core block, and the fixed-length payload to pass therethrough as they are.

The main signal data generated in the foregoing manner is applied to MAC generation processing circuit 60 which generates a multiplexed MAC frame which has the main signal data stored in its payload. The generated multiplexed MAC frame is sent from E/O circuit 95 onto a relay GbE line.

On the other hand, upon receipt of main signal data from a GbE line, the main signal data is converted to an electric signal by O/E circuit 96, and undergoes the MAC termination processing such as removal of the preamble, FCS checking, and the like in GbE MAC terminator circuit 61. In this event, GbE MAC terminator circuit 61 delivers a GbE line fault detection signal at "1" in response to detection of link-down on a relay GbE line.

A signal applied to second GBP relay processing circuit 59 is a multiplexed MAC frame which has m FE paths multiplexed thereon. Second GBP relay processing circuit 59 extracts GBP capsules for each FE path for storage in a VC-4 frame associated with each FE path. Then, second GBP relay processing circuit 59 inserts idle frames as appropriate for adjusting the rate with the VC-4 frame.

When the GbE line fault detection signal received from GbE MAC generation processing circuit 61 is at "1," second GBP relay processing circuit 59 sets a code ("1") indicative of the presence of a line fault in the forward relay line fault notification field in the GBP transport header of every FE path which passes through second GBP relay processing circuit 59. Further, second GBP relay processing circuit 59 overwrites the fixed-length payload in the GBP core block with a fixed pattern (entirely composed of "1" or the like) indicative of a predefined idle frame. In other words, the occurrence of a fault is detected on a relay line of the FE path on which the forward direction is defined from the relay GbE line to the relay 10G SONET/SDH line.

When the GbE line fault detection signal is at "0," second GBP relay processing circuit 59 allows the forward relay line fault notification field to pass therethrough as it is. Also, second GBP relay processing circuit 59 allows the backward relay line fault notification field, the type field in the GBP core block, and the fixed-length payload to pass therethrough as they are.

The frame thus generated is applied to TDM MUX processing circuit 41 which multiplexes this frame with FE paths applied from other GbE ports. They are multiplexed in a predefined order. Then, SONET/SDH transmission processing circuit 55 adds a section overhead (SOH) and a path overhead (POH), and the resulting multiplexed frame is sent from E/O circuit 54 to a relay 10G SONET/SDH line.

Next, description will be made on the operation when a fault occurs on a relay line in the wide area Ethernet network illustrated in FIG. 6. When no fault occurs on any of client lines and relay lines, GBP relay processing circuit 21-1 and GBP processing circuit 17-1 each set a code indicative of the absence of a line fault in the GBP transport header, the forward relay line fault notification field and the backward relay line fault notification field of the GBP capsule. In this event, a code indicative of no client line fault is also set in the type field in the GBP core block.

First, an alarm transfer operation will be described when a fault occurs on a client line in the situation as mentioned above.

Figure 9:
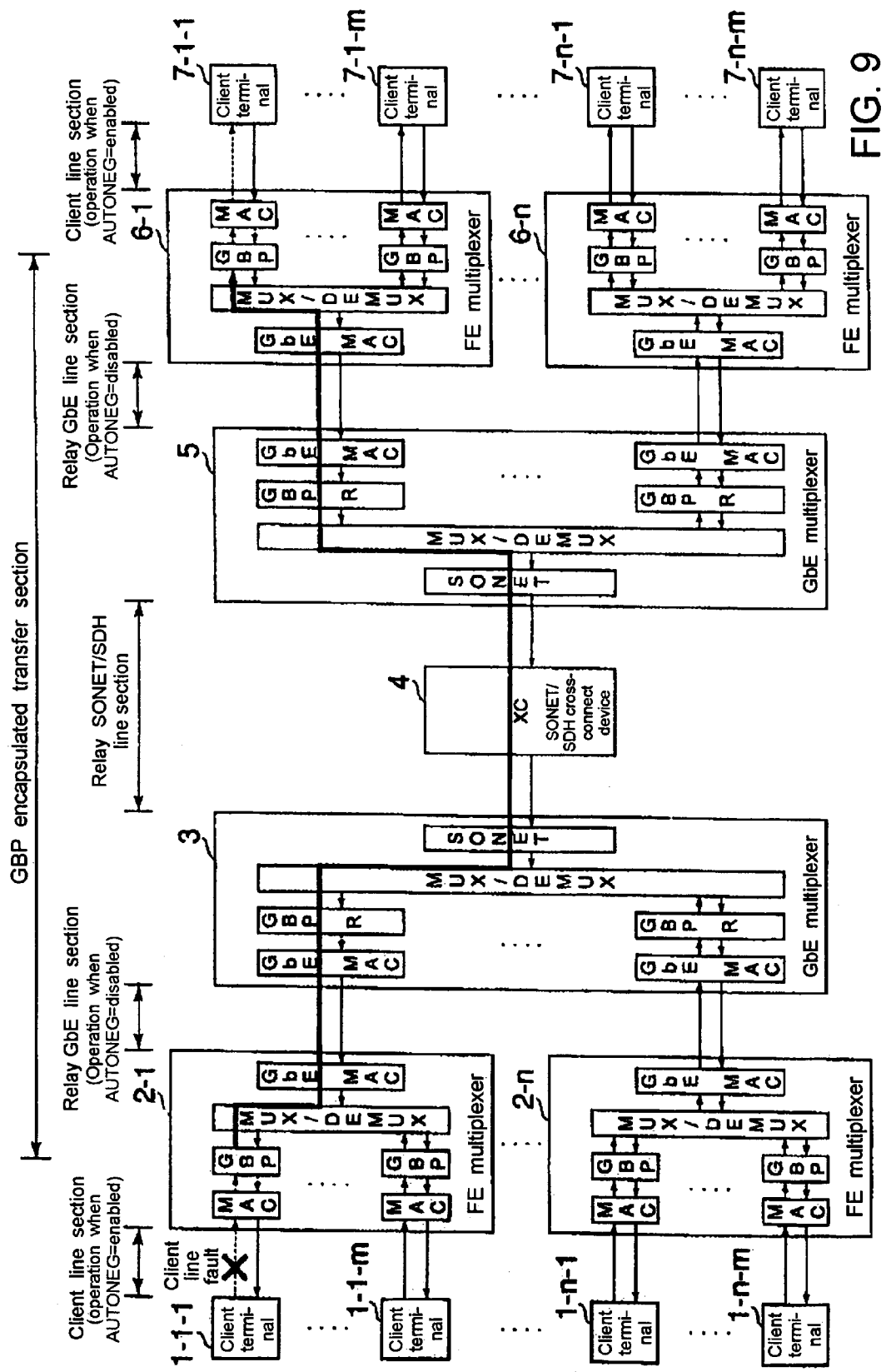
FIG. 9 is a block diagram illustrating an alarm transfer operation when a fault occurs on a client line in the wide area Ethernet network illustrated in FIG. 6.

FIG. 9 illustrates an alarm transfer operation when a fault occurs on a client line in the wide area Ethernet network illustrated in FIG. 6. As illustrated in FIG. 9, a fault occurs on a client line which interconnects client terminal 1-1-1 and FE multiplexer 2-1, and as link-down is accordingly detected by FE MAC processing circuit 16-1 in FE multiplexer 2-1, GBP processing circuit 17-1 in FE multiplexer 2-1 sets a code indicative of a client line fault notification in the type field in the GBP core block of a GBP capsule which is transferred through the FE path on which the fault has occurred. In this event, no change is made to the GBP transport header. The fixed-length payload in the GBP core block is overwritten with a predefined code indicative of an idle frame (entirely composed of "1" or the like), so that no client data is transferred in the downstream direction.

This GBP capsule is transferred down to GBP processing circuit 17-1 in opposing FE multiplexer 6-1, so that GBP processing circuit 17-1 detects a client fault notification in the GBP core block. FE multiplexer 6-1 forcefully transitions only a client line downstream of FE MAC processing circuit 16-1 to link-down to accomplish the link-pass-through only for the downstream of the FE path on which the client line fault has occurred. In this event, any alarm is not transferred in the backward direction of that path or to other FE paths.

Next, description will be described on an alarm transfer operation when a fault occurs on a relay GbE line.

Figure 10:
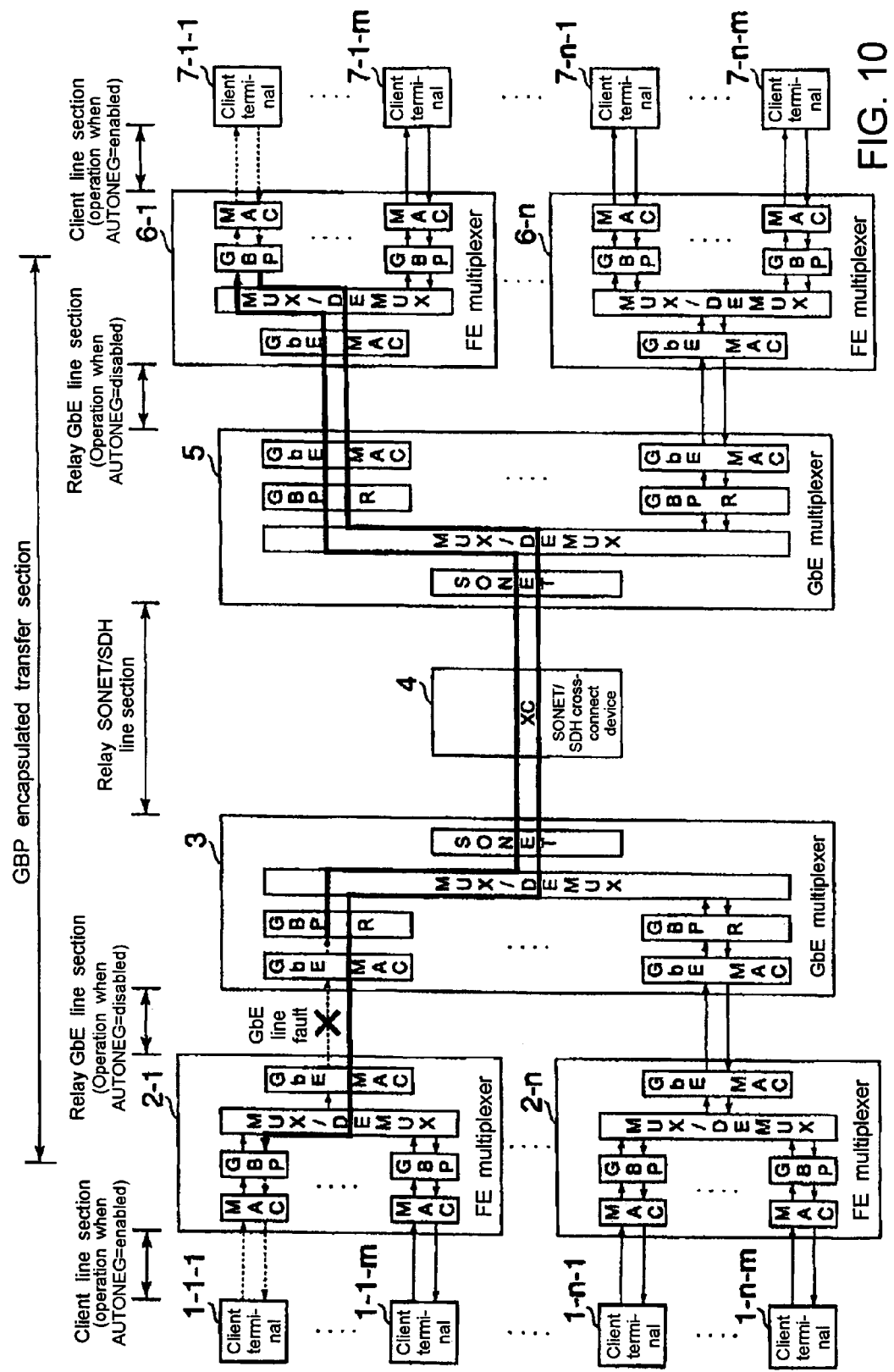
FIG. 10 is a block diagram illustrating an example of the alarm transfer operation when a fault occurs on a relay GbE line in the wide area Ethernet network illustrated in FIG. 6.

FIG. 10 illustrates an alarm transfer operation when a fault occurs on a relay GbE line in the wide area Ethernet network illustrated in FIG. 6. Since the relay GbE line is operated with the auto-negotiation function being disabled as mentioned above, a line fault in the forward direction, if any, would not cause a transition to link-down of the same section in the backward direction.

As illustrated in FIG. 10, a fault occurs on a relay GbE line which interconnects FE multiplexer 2-1 and GbE multiplexer 3, and as link-down is accordingly detected by GbE MAC processing unit 20-1 in GbE multiplexer 3, GBP relay processing circuit 21-1 of GbE multiplexer 3 sets a code indicative of the presence of a line fault in the forward relay line fault notification field in the GBP transport header of a corresponding GBP capsule, sets a code ("0") indicative of the absence of a line fault in the backward relay line fault notification field, and sets a code indicative of no client line fault in the type field in the GBP core block. GBP relay processing circuit 21-1 also sets the fixed payload to a predefined pattern (entirely composed of "1" or the like) indicative of an idle frame. This processing is performed on every FE path which passes along the relay GbE line on which the line fault has occurred.

The frame generated by GBP relay processing circuit 21-2 in the GbE multiplexer 3 is transferred down to GBP processing circuit 17-1 in opposing FE multiplexer 6-1, where GBP processing circuit 17-1 detects the forward relay line fault notification in the GBP transport header. When the forward relay line fault notification is not cleared after the lapse of APS protection time $T_{APS}$, FE multiplexer 6-1 forcefully transitions only a client line downstream of FE MAC processing circuit 16-1 to link-down to accomplish the link-pass-through for the downstream. This link-pass-through processing is performed on every Ethernet path which passes along the relay GbE line on which the line fault has occurred. Then, GBP processing circuit 17-1 sets a code ("0") indicative of the absence of a line fault in the forward relay line fault notification field in the GBP transport header of a corresponding GBP capsule, sets a code ("1") indicative of the presence of a line fault in the backward relay line fault notification field, sets a code indicative of no client line fault in the type field in the GBP core block, and allows the fixed-length payload to pass therethrough as it is. The resulting multiplexed MAC frame is sent in the backward direction. This processing is performed on every FE path which imposes the forced down-link to downstream client lines.

The frame delivered from GBP processing circuit 17-1 is transferred down to opposing FE multiplexer 2-1 which detects the backward relay line fault notification in the GBP transport header. In this event, FE multiplexer 2-1 forcefully transitions only a client line downstream of FE MAC processing circuit 16-1 to link-down.

As described above, since the auto-negotiation function is enabled in the client line section, FE paths in the forward direction also transition to link-down. In this way, an alarm is transferred to upstream client terminal 1-1-1 as well to accomplish the link-pass-through for the upstream client terminal. This processing is performed on every FE path which has undergone the link-pass-through processing in the downstream direction resulting from the fault on the relay GbE line.

Next, description will be made on an second example of the alarm transfer operation when a fault occurs on a relay GbE line.

Figure 11:
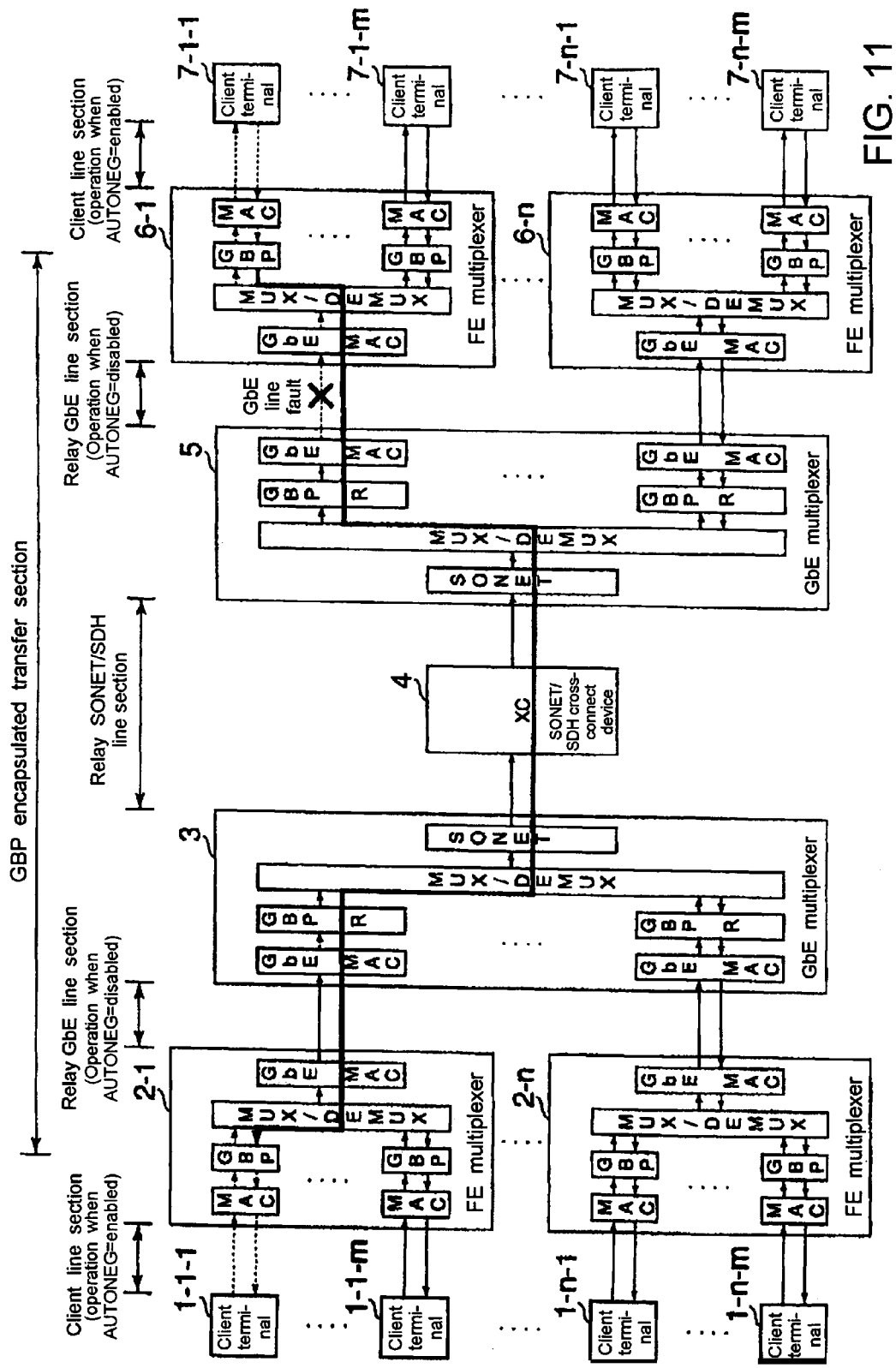
FIG. 11 is a block diagram illustrating a second example of the alarm transfer operation when a fault occurs on the relay GbE line in the wide area Ethernet network illustrated in FIG. 6.

FIG. 11 illustrates a second alarm transfer operation when a fault occurs on a relay GbE line in the wide area Ethernet network illustrated in FIG. 6. Since the auto-negotiation function is disabled on the relay GbE line as mentioned above, a line fault in the forward direction, if any, would not cause down-link of the same section in the backward direction.

As illustrated in FIG. 11, a fault occurs on a relay GbE line which interconnects FE multiplexer 6-1 and GbE multiplexer 5, and as link-down is accordingly detected by GbE MAC processing unit 20-1 in GbE multiplexer 5, GbE multiplexer 5 assumes a relay line fault in the forward direction. Then, if the relay GbE line has not been recovered from link-down even after the lapse of APS protection time $T_{APS}$, FE MAC processing circuit 16-1 in FE multiplexer 6-1 forcefully transitions a client line downstream of the failed relay GbE line to link-down to accomplish the link-pass-through for the downstream. This processing is performed on every FE path which passes along the relay GbE line on which the line fault has occurred.

Then, GBP processing circuit 17-1 sets a code ("0") indicative of the absence of a line fault in the forward line fault notification field in the GBP transport header of a corresponding GBP capsule, sets a code ("1") indicative of the presence of a line fault in the backward relay line fault notification field, sets a code indicative of no client line fault in the type field in the GBP core block, and allows the fixed length payload to pass therethrough as it is. The resulting multiplexed MAC frame is sent in the backward direction. This processing is performed on every FE path which causes the forced link-down to downstream client lines.

The multiplexed MAC frame sent from FE multiplexer 6-1 is transferred down to opposing FE multiplexer 2-1 which detects the backward relay line fault notification in the GBP transport header. FE multiplexer 2-1 immediately transitions only a client line downstream of FE MAC processing circuit 16-1 to link-down in a forcible manner.

Since the auto-negotiation function is enabled in a client line section as mentioned above, FE paths in the forward direction also transition to link-down. Consequently, an alarm is additionally transferred to upstream client terminal 1-1-1 to accomplish the link-pass-through for the upstream client terminal. This processing is performed on every FE path which has undergone the link-pass-through processing in the downstream direction resulting from the fault on the relay GbE line.

Next, description will be made on an alarm transfer operation when a fault occurs on a relay 10G SONET/SDH line.

Figure 12:
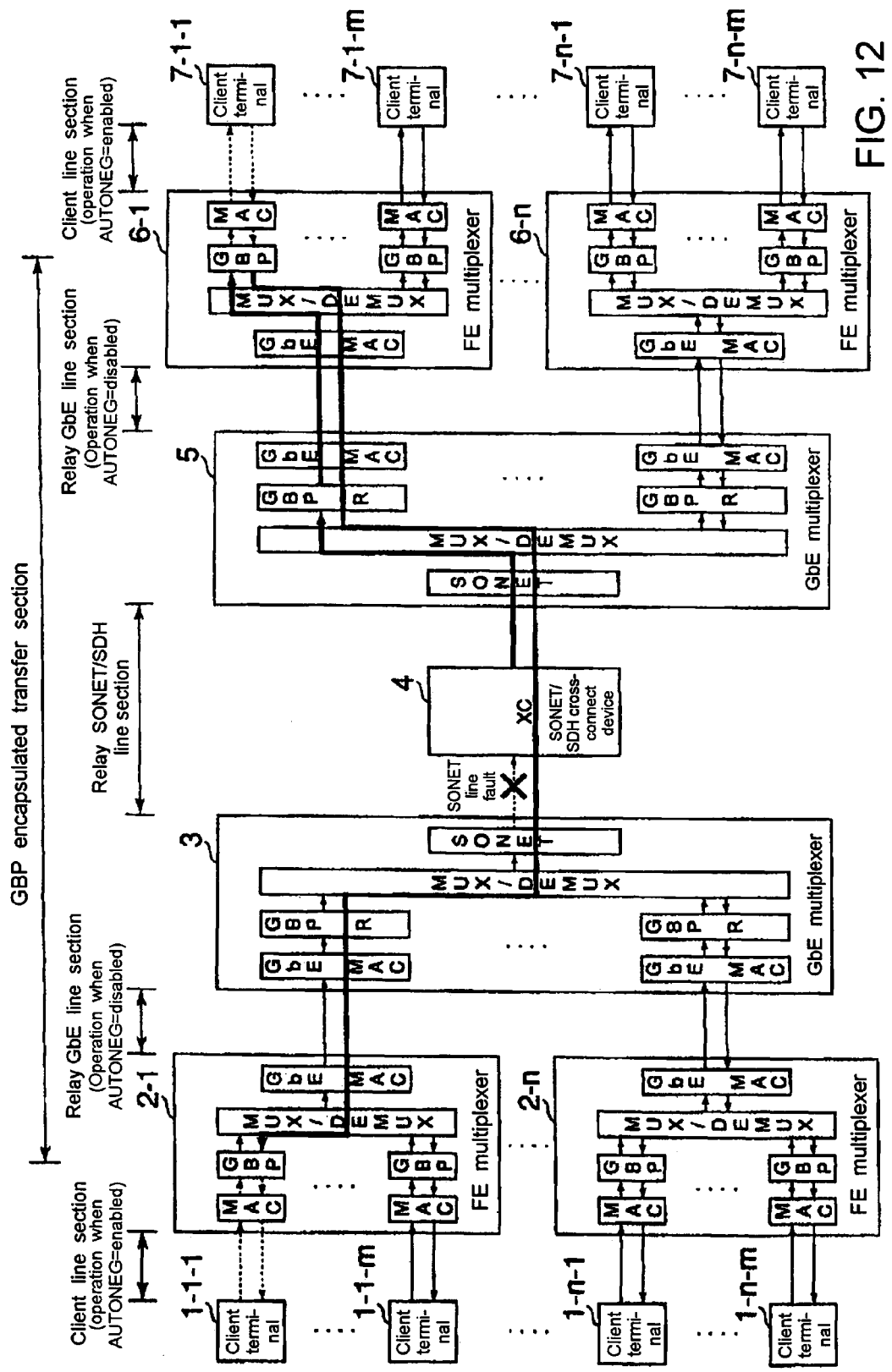
FIG. 12 is a block diagram illustrating the alarm transfer operation when a fault occurs on a relay 10G SONET/SDH line in the wide area Ethernet network illustrated in FIG. 6.

FIG. 12 illustrates the alarm transfer operation when a fault occurs on a relay 10G SONET/SDH line in the wide area Ethernet network illustrated in FIG. 6. Specifically, FIG. 12 illustrates the alarm transfer operation when a fault occurs on a relay 10G SONET/SDH line which interconnects GbE multiplexer 3 and SONET/SDH cross-connect device 4.

As illustrated in FIG. 12, as a fault occurs on the relay 10G SONET/SDH line, SONET/SDH cross-connect device 4 which detects the fault issues path AIS alarm 24 to associated FE paths in the downstream direction. Specifically, SONET/SDH cross-connect device 4 sets all SONET/SDH pointer values to "1" and entirely overwrites a payload field with all "1." This processing is performed only on an FE path on which a path AIS is detected when it is triggered by a path fault which may occur in VC-4 units, and is performed on every FE path which passes along the 10G SONET/SDH line when it is triggered by a link fault such as an interruption of optical input.

Upon detection of the path AIS, 10G SONET generator/terminator circuit 23 in GbE multiplexer 5 further transfers the path AIS in the downstream direction. Then, GBP relay processing circuit 21-1 sets a code ("1") indicative of the presence of a line fault in the forward relay line fault notification field in the GBP transport header of a corresponding GBP capsule, sets a code ("0") indicative of the absence of a line fault in the backward relay line fault notification field, sets a code indicative of no client line fault in the type field in the GBP core block, and sets the fixed-length payload to a predefined pattern (entirely comprised of "1" or the like) indicative of an idle frame.

The multiplexed MAC frame including this GBP capsule is transferred down to GBP processing circuit 17-1 in FE multiplexer 6-1 which detects the forward relay line fault notification in the GBP transport header. If the forward relay line fault has not been recovered even after the lapse of APS protection time $T_{APS}$, FE multiplexer 6-1 forcefully transitions only a client line downstream of FE MAC processing circuit 16-1 to link-down to accomplish the link-pass-through for the downstream. This processing is performed on every FE path which passes along the relay 10G SONET/SDH line on which the fault has occurred.

Then, GBP processing circuit 17-1 in FE multiplexer 6-1 sets a code ("0") indicative of the absence of a line fault in the forward line fault notification field in the GBP transport header of a corresponding GBP capsule, sets a code ("1") indicative of the presence of a line fault in the backward relay line fault notification field, sets a code indicative of no client line fault in the type field in the GBP core block, and allows the fixed-length payload to pass therethrough as it is. The resulting multiplexed MAC frame is sent in the backward direction.

The multiplexed MAC frame is transferred down to opposing FE multiplexer 2-1 which detects the backward relay line fault notification in the GBP transport header. FE multiplexer 2-1 immediately transitions only a client line downstream of FE MAC processing circuit 16-1 to link-down in a forcible manner. Since the auto-negotiation function is enabled in a client line section, FE paths in the forward direction also transition to link-down. Consequently, an alarm is additionally transferred to upstream client terminal 1-1-1 to accomplish the link-pass-through. This processing is performed on every FE path which has undergone the link-pass-through processing in the downstream direction resulting from the fault on the relay 10G SONET/SDH line.

In the configuration illustrated in FIG. 6, frames from a plurality of client lines are multiplexed for transfer to a relay GbE line, they are again multiplexed for transfer to a relay 10G SONET/SDH line, frames passing through the 10G SONET/SDH network are demultiplexed for transfer to relay GbE lines, and they are again demultiplexed for transfer to client lines. Alternatively, for example, frames demultiplexed by the GbE multiplexer may be again multiplexed for transfer to a relay 10G SONET/SDH line, and the multiplexed frames may be again demultiplexed for transfer to relay GbE lines, and they may be again demultiplexed for transfer to client lines. Further alternatively, frames from a plurality of client lines may be transferred only through the relay 10G SONET/SDH lines. As such, the first embodiment can be applied to other network configurations as well.

Also, FIG. 6 illustrates the configuration in which client lines are provided by an FE network, and relay lines are provided by a GbE network and a 10G SONET/SDH network. Alternatively, the first embodiment can also be applied to a network configuration in which client lines are provided by a GbE network, they are multiplexed for transfer to 10-gigabit Ethernet (10GbE) lines, they are again multiplexed for transfer to 40G SONET/SDH lines, frames which have passed through a 40G SONET/SDH network are demultiplexed for transfer to 10-gigabit Ethernet (10GbE) lines, and they are again demultiplexed for transfer to client lines provided by a GbE network.

According to the alarm transfer method and wide area Ethernet network of the present invention, the GBP transport header of the GBP capsule is provided with the forward line fault notification field and backward relay line fault notification field, so that a notification on a fault occurring on a relay line can be transferred in the forward direction and backward direction, respectively. Further, since a fault on a client line can be notified using the type field in the GBP core block, the link-pass-through can be accomplished for downstream client terminals in Ethernet path units at the egress node, while the link-pass-through can be accomplished for upstream client terminals in Ethernet path units at the ingress node.

In addition, when a forward relay line fault notification is transferred down to the egress node, while a backward relay line fault notification is transferred from the egress node to the ingress node, information on a fault occurring on a relay GbE line, a relay 10G SONET/SDH line and the like can be transferred to a terminal of a communication partner, thereby making it possible to accomplish the link-pass-through of a relay line fault even in a wide area Ethernet network configuration which utilizes a plurality of types of transmission networks.

Further, the forward relay line fault notification is transferred down to the egress node, from which a backward relay line fault notification is issued, rather than being returned from an intervening relay device as a backward relay line fault notification, so that the APS timer circuit need not be provided in the relay devices but is required only in the egress node. The APS timer circuit counts the protection time which is required for switching one transmission path to another as mentioned above, and switches a transmission path of a relay line when the forward relay line fault notification is continuously received even after the lapse of the time $T_{APS}$ defined by the APS timer circuit. Generally, the APS timer circuit must be provided in each Ethernet path, so that for providing the APS timer circuit in each of GbE multiplexers, m×n APS timer circuits are required, for example, in the network configuration illustrated in FIG. 6. On the other hand, since the APS timer circuit is provided in each FE multiplexer in the first embodiment, a required quantity of the APS timer circuits is only m which is equal to the number of FE multiplexers installed in the network configuration of FIG. 6. Consequently, it is possible to limit the circuit scale per node.

Second Embodiment

A wide area Ethernet network according to a second embodiment provides redundancy for relay sections thereof. For this purpose, the second embodiment proposes a mechanism which relies on a fault notification and the like transferred by the alarm transfer method shown in the first embodiment to switch a relay line from a normally used active route to a spare route, and vice versa.

Figure 13:
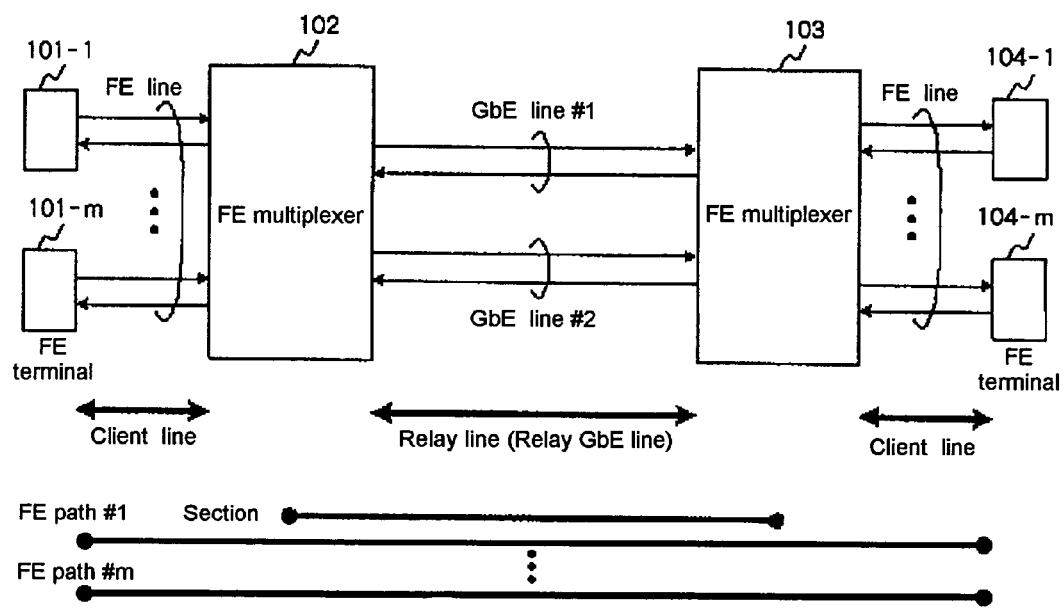
FIG. 13 is a block diagram illustrating the configuration of a wide area Ethernet network according to a second embodiment of the present invention.
Figure 14:
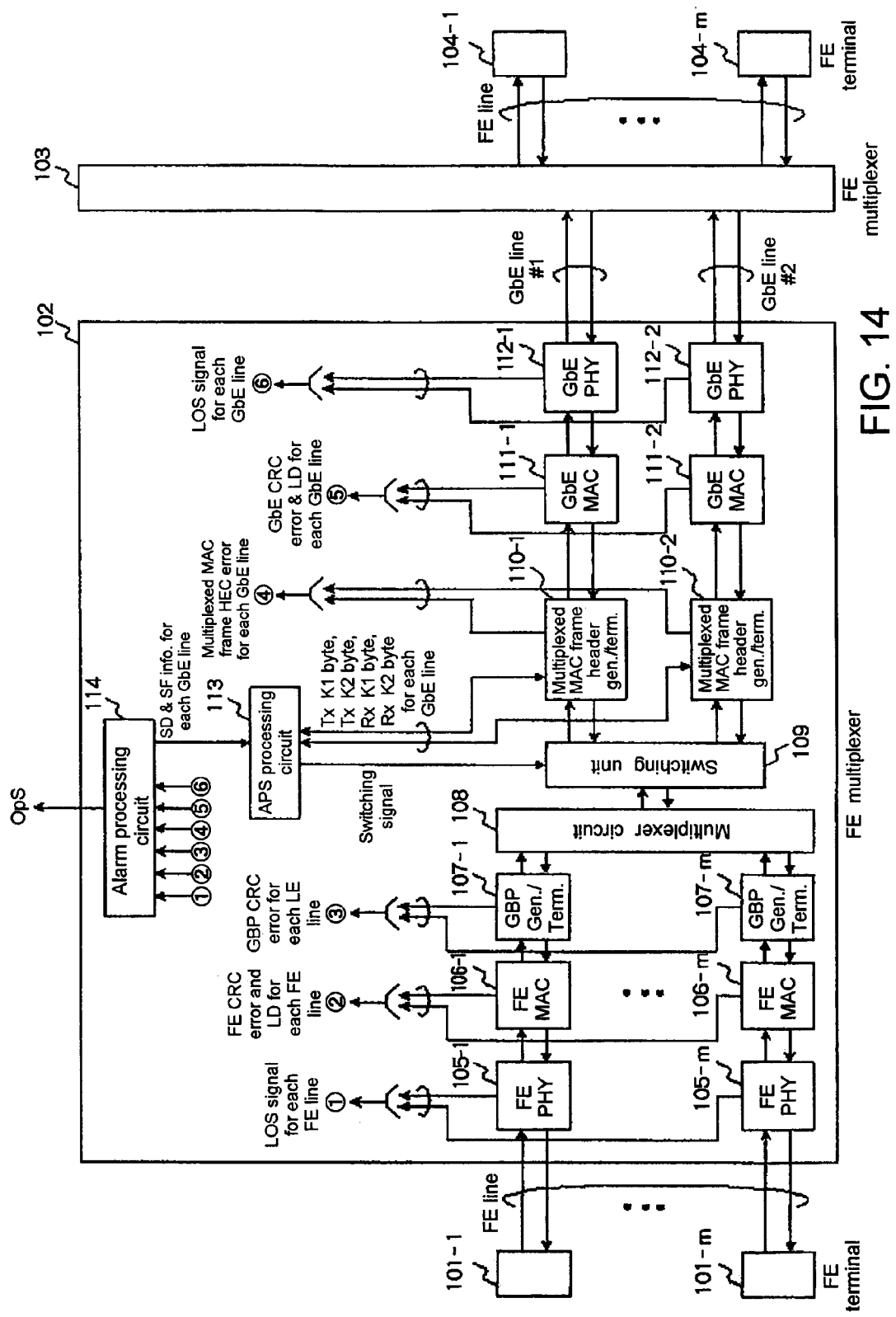
FIG. 14 is a block diagram illustrating the configuration of an FE multiplexer shown in FIG. 13.

FIG. 13 illustrates the configuration of the wide area Ethernet network according to the second embodiment, and FIG. 14 illustrates the configuration of an FE multiplexer shown in FIG. 13. FIG. 15 shows exemplary classifications for the operation of an alarm processing circuit contained in the FE multiplexer illustrated in FIG. 14.

In the wide area Ethernet network of the second embodiment, a plurality of Ethernet networks, each of which accommodates a plurality of client terminals, are relayed by a GbE network which comprises relay lines or GbE lines that are made redundant. The Ethernet networks which accommodate client terminals are implemented by FE networks which provide the transmission capability of 10 Mbps or 100 Mbps. It should be noted that GBP (Generic Blocking Procedure) is utilized for encapsulating higher-level protocol data such as a MAC frame and the like delivered from the client terminal, as is the case with the first embodiment. Since the frame format for GBP is similar to that in the first embodiment, description thereon is omitted here.

As illustrated in FIG. 13, the wide area Ethernet network of the second embodiment comprises FE multiplexers 2, 3, which are edge nodes, interconnected through two redundant GbE lines #1, #2. Client terminals 101-1 to 101-m are connected to FE multiplexer 2 which is one of the edge nodes, while opposing client terminals 104-1 to 104-m are connected to FE multiplexer 3 which is the other edge node. One of GbE line #1 and GbE line #2 is assigned as an active route, and the other as a spare route. Client terminals 101-1 to 101-m are identical in configuration to client terminals 104-1 to 104-m, though they are installed at locations opposite to each other across relay lines. The client terminals may be Ethernet switches such as hubs.

In the following, each line for interconnecting a client terminal and an FE multiplexer shown in FIG. 13 is called the "client line," and a line for interconnecting FE multiplexers is called the "relay GbE line." The number m of multiplexing provided by respective FE multiplexers 102, 103 is set, for example, to a positive integer equal to or less than eight from the relationship between the capacity of the GbE line and an FE frame transfer band. In other words, the number m of FE paths equal to eight or less are accommodated in a multiplexed MAC frame (see FIGS. 4A to 4C) which is transferred between FE multiplexers 102, 103 through relay GbE lines.

For making a communication between client terminals opposing each other across the relay GbE lines in the wide area Ethernet network illustrated in FIG. 13, as a source client terminal and a destination client terminal are determined, multiplexing/demultiplexing orders are determined in associated FE multiplexers in accordance with a transmission path which interconnects these client terminals. By thus determining line settings in each node in accordance with the source client terminal and destination client terminal, higher-level protocol data sent from an arbitrary client terminal is transferred only to a determined client terminal. A data flow which passes through a fixed transmission path built by the line settings for transmitting Ethernet frames is called the "Ethernet path." Here, such a transmission path is called the "FE path" when a client line is an FE line, and is called the "GbE path" when a client line is a GbE path. Assume in FIG. 13 that an FE path is set for a transmission path from client terminal 101-1 to client terminal 104-1, and likewise, FE paths are set between client terminals 101-2 and 104-2; between client terminals 101-3 and 104-3; . . . ; between client terminals 101-m and 104-m, respectively. An FE path may be set between arbitrary client terminals.

Next, the FE multiplexer in the second embodiment will be described in detail with reference to FIG. 14. As illustrated in FIG. 14, FE multiplexer 102 comprises FE PHY processing circuits 105-1 to 105-m each for transmitting/receiving FE frames to/from an associated client line; FE MAC processing circuits 106-1 to 106-m each -for performing MAC layer processing for the FE frame; GBP generator/terminator circuits 107-1 to 107-m each for encapsulating FE frames received from each FE line into GBP capsules and decapsulating GBP capsules into FE frames for transmission onto each FE line; multiplexer circuit 108 for multiplexing/demultiplexing GBP capsules of each FE path in a predefined order; switching unit 109 for switching GbE line #1 and GbE line #2, which are redundant relay GbE lines, from one to the other as the active route and spare route; multiplexed MAC frame header generator/terminator circuits 110-1, 110-2 each for generating and terminating a multiplexed MAC frame header for each GbE line; GbE MAC processing circuits 111-1, 111-2 each for adding a normal GbE MAC header and FCS to data to which the multiplexed MAC frame header has been added; GbE PHY processing circuits 112-1, 112-2 each for transmitting/receiving GbE frames to/from the relay GbE lines; alarm processing circuit 114 for generating an SD (Signal Degrade) signal and an SF (Signal Fail) signal for switching GbE lines #1, #2; and APS (Automatic Protection Switching) processing circuit 113 for determining line situations on the active route and spare route of the relay GbE lines to select the active route or spare route. FE multiplexer 104 is similar to FE multiplexer 102 in configuration described above.

FE PHY processing circuits 105-1 to 105-m each comprise a physical device for transmitting FE frames, and a physical device for receiving FE frames, respectively, for transmitting/receiving FE frames to/from an associated client line. FE PHY processing circuits 105-1 to 105-m also have a function of detecting an interruption of FE input.

FE MAC processing circuits 106-1 to 106-m each perform the MAC layer processing on the FE frames, and have a function of detecting FE link-down.

GBP generator/terminator circuits 107-1 to 107-m each encapsulate FE frames received from each FE line into GBP capsules and decapsulate GBP capsules into FE frames, and have a CRC error detecting function for the GBP capsule, and an alarm transfer function.

Multiplexer circuit 108 multiplexes or demultiplexes GBP capsules for each FE path in a predefined order.

Switching unit 109 switches GbE line #1 and GbE line #2, which are redundant relay GbE lines, to the active route or spare route in response to a switching signal from APS processing circuit 113.

Multiplexed MAC frame header generator/terminator circuits 110-1, 110-2 each generate and terminate a multiplexed MAC frame header for each GbE line. Specifically, each multiplexed MAC frame header generator/terminator circuit generates a sequence number, a K1 byte, and a K2 byte and performs HEC operation processing on the transmission side, and checks the continuity of sequence numbers, extracts the K1 byte and K2 byte, and checks the HEC operation on the reception side. Each multiplexed MAC frame header generator/terminator circuit also has an APS byte defect detecting function.

GbE MAC processing circuits 111-1, 111-2 each add a MAC header of normal GbE and FCS to data to which the multiplexed MAC frame header has been added. GbE MAC processing circuit 111-1, 111-2 also have a function of detecting link-down on a GbE line, and an FCS error detecting function on the reception side.

GbE PHY processing circuits 112-1, 112-2 each comprise a physical device for transmitting GbE frames, and a physical device for receiving GbE frames, and transmit/receive GbE frames to/from relay GbE lines. GbE PHY processing circuit 112-1, 112-2 additionally have a function of detecting an interruption of GbE optical input.

Alarm processing circuit 114 collects a variety of detected error signals from the respective circuits mentioned above to generate the SD signal and SF signal for switching GbE lines #1, #2, and applies. APS processing circuit 113 with the SD signal and SF signal for each of GbE lines #1, #2.

APS processing circuit 113 uses the SD signal and SF signal for each of GbE lines #1, #2 supplied from alarm processing circuit 114, and the reception-related K1 byte and reception-related K2 byte supplied from multiplexed MAC frame header generator/terminator circuits 110-1, 110-2 to determine the line situations for the active route and spare route, respectively, to select the active route or spare route. A selection signal indicative of the result of the selection is transferred to switching unit 109. APS processing circuit 113 also generates a transmission-related K1 byte and a transmission-related K2 byte which are delivered to multiplexed MAC frame header generator/terminator circuits 110-1, 110-2. The selection of the active route or spare route, and the generation of the K1 byte and K2 byte are both performed in accordance with ITU-T Recommendation G.841 (October 1998). In a configuration in which no redundant relay GbE line is provided, the relay GbE line switching signal is not changed whichever value is taken by the SD signal and SF signal for each GbE line, and the reception-related K1 byte and reception-related K2 byte.

FIG. 15 illustrates an alarm identifying method for each error detection signal, which is executed by alarm processing circuit 114 in the second embodiment. As illustrated in FIG. 15, alarms detected by alarm processing circuit 114 are classified into an alarm detected for each FE path, and an alarm detected for each GbE line (each section). These detected alarms may be delivered to OpS (network operation system). Also, upon detection of an alarm classified as SD and an alarm classified as SF out of detected alarms, alarm processing circuit 114 applies APS processing circuit 13 with a signal indicative of SD or SF in units of GbE lines (sections).

While FIG. 15 shows the alarm identification on the assumption that this is applied in a network configuration which is provided with redundant relay GbE lines, alarm processing circuit 114 can make the alarm identification shown in FIG. 15 from the results of error detections in the respective circuits shown in FIG. 13 even in a network configuration which is not provided with redundant relay GbE lines.

Next, description will be made on the operation of selecting one from the redundant relay GbE lines. The following description will be made for an example in which GbE line #1 is assigned as the active route, and GbE line #2 as the spare route in the operation of the wide area Ethernet network illustrated in FIG. 13.

In these settings, FE multiplexer 102 on the transmission side generates a multiplexed MAC frame from data received from client terminals 101-1 to 101-m, and applies the multiplexed MAC frame to GbE line #1 and GbE line #2, respectively. FE multiplexer 103 on the reception side receives multiplexed MAC frames from both active and spare relay lines. Then, FE multiplexer 103 extracts main signal data from GbE line #1 which is the active route, extracts the K1 byte and K2 byte from GbE line #2 which is the spare route, and determines in APS processing circuit 113 in accordance with the extracted reception-related K1 byte and K2 byte whether or not the switching should be made.

In this event, if a line fault occurs on GbE line #1 which is the active route, a system switching operation is immediately performed by monitoring the K1 byte and K2 byte communicated between FE multiplexers 102, 103, thereby switching GbE line #2 to the active route and GbE line #1 to the spare route. These operations can be similarly carried out when the active route is initially assigned to GbE line #2, and the spare route to GbE line #1.

In the wide area Ethernet network illustrated in FIG. 13, the client terminals are implemented by FE terminals by way of example. Alternatively, the wide area Ethernet network of the second embodiment can be applied to any other higher-level protocol such as Fiber Channel as well.

According to the wide area Ethernet network of the second embodiment, the transmission medium network layer is monitored for a fault using the result of the operation on the FCS field in the multiplexed MAC frame, and the path network layer is monitored for a fault using the result of the operation on the CRC field in the GBP capsule for each Ethernet path. Consequently, the section and path can be managed independently of one another as in the SONET/SDH network, thereby making it possible to organize a transmission network in a layered structure comprised of a transmission medium network layer and a network layer.

Therefore, even in a wide area Ethernet network which applies GBP encapsulation using an Ethernet network as an intermediate section, the designing, maintenance, and operation of the network can be managed in a layered structure, as in a wide area Ethernet network which uses a SONET/SDH network as an intermediate section, to provide advanced network services.

Third Embodiment

A wide area Ethernet network according to a third embodiment provides redundancy for a relay section thereof. For this purpose, the third embodiment proposes a mechanism which relies on a fault notification and the like transferred by the alarm transfer method shown in the first embodiment to switch a relay line from a normally used active route to a spare route, and vice versa.

Figure 16:
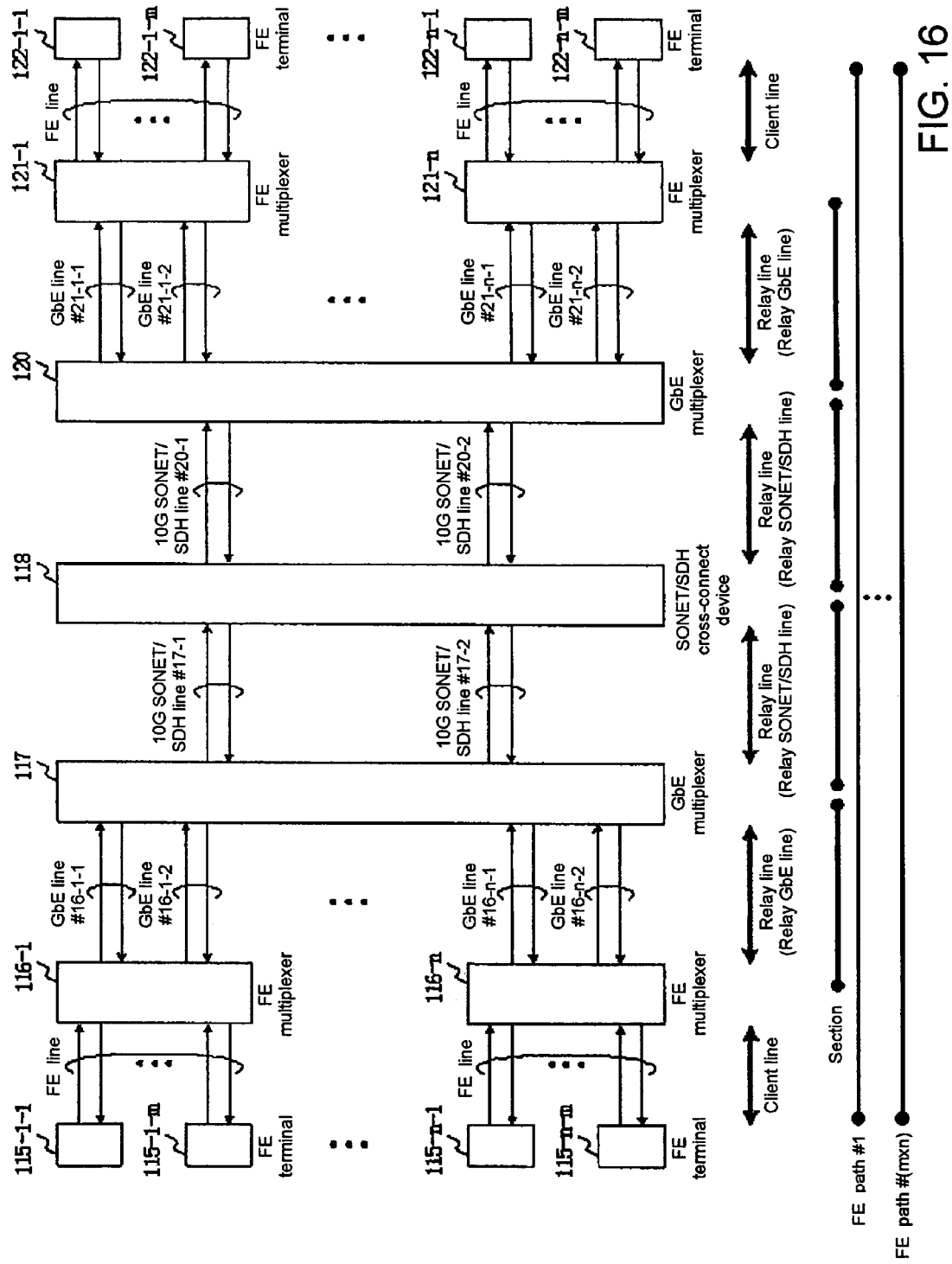
FIG. 16 is a block diagram illustrating the configuration of a wide area Ethernet network according to a third embodiment of the present invention.
Figure 17:
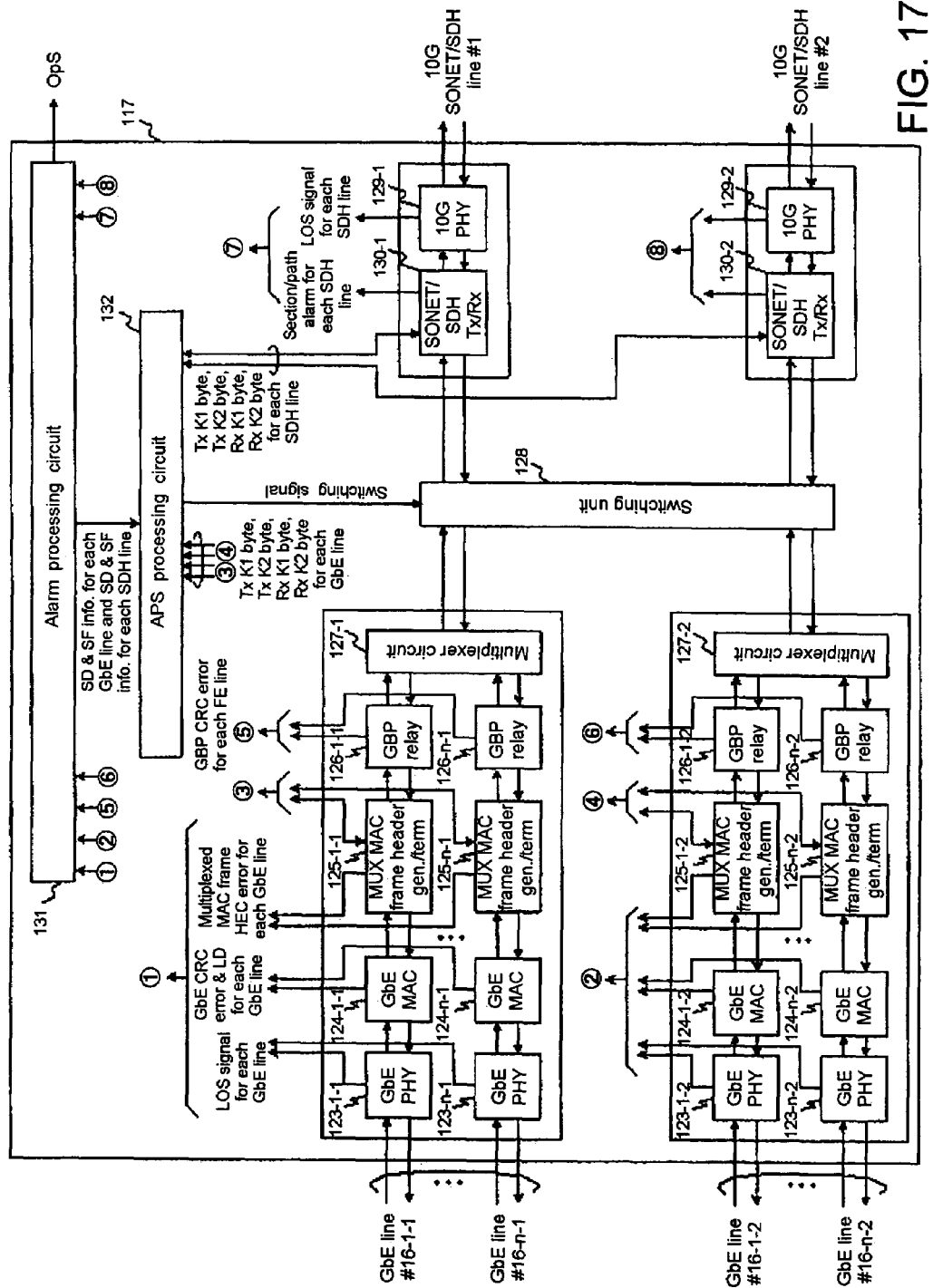
FIG. 17 is a block diagram illustrating the configuration of a GbE multiplexer shown in FIG. 16.

FIG. 16 illustrates the configuration of the wide area Ethernet network according to the third embodiment. FIG. 17 illustrates the configuration of a GbE multiplexer shown in FIG. 16, and FIG. 18 shows exemplary classifications for the operation of an alarm processing circuit contained in the GbE multiplexer illustrated in FIG. 17.

As illustrated in FIG. 16, the wide area network according to the third embodiment comprises a plurality of Ethernet networks, each of which accommodates a plurality of client terminals. The Ethernet networks are accommodated in relay lines which make up a GbE network, and the GbE lines are further multiplexed on and accommodated in a 10G SONET/SDH line which has a transmission rate of 9.953 Gbps. The Ethernet networks which accommodate client terminals are implemented by FE networks which provide the transmission capability of 10 Mbps or 100 Mbps. It should be noted that GBP (Generic Blocking Procedure) is utilized for encapsulating higher-level protocol data such as a MAC frame and the like delivered from the client terminal, as is the case with the first embodiment. Since the frame format for GBP is similar to that in the first embodiment, description thereon is omitted here.

As illustrated in FIG. 16, the wide area Ethernet network of the third embodiment comprises FE multiplexers 116-1 to 116-n, which are edge nodes, are respectively connected through two redundant GbE lines #16-k-1, #16-k-2 (k is a positive integer which satisfies 1≦k≦n). Likewise, FE multiplexers 121-1 to 121-n, which are edge nodes, are respectively connected through two redundant GbE lines #21-k-1, #21-k-2 (k is a positive integer which satisfies 1≦k≦n).

One of GbE line #16-k-1 and GbE line #16-k-2 is assigned as an active route, and the other as a spare route. Likewise, one of GbE line #21-k-1 and GbE line #21-k-2 is assigned as an active route, and the other as a spare route.

Client terminals 115-1-1 to 115-n-m are respectively connected to FE multiplexers 116-1 to 116-n which are edge nodes, while opposing client terminals 122-1-1 to 122-n-m are respectively connected to FE multiplexers 121-1 to 121-n which are edge nodes. Client terminals 115-1-1 to 115-n-m are identical in configuration to client terminals 122-1-1 to 122-n-m, though they are installed at locations opposite to each other across relay lines. The client terminals may be Ethernet switches such as hubs.

In the wide area Ethernet network of the third embodiment, GbE multiplexer 117 and Gbe multiplexer 120, each of which accommodates a plurality of GbE lines, are connected to each other through SONET/SDH cross-connect device 118 by way of redundant 10G SONET/SDH lines (hereinafter also called the "relay SONET/SDH lines") #17-1, #17-2, #20-1, #20-2.

SONET/SDH cross-connect device 118 has a function of generating/terminating SOH of the SONET/SDH lines, and a function of switching the redundant system based on the K1 byte and K2 byte. While SONET/SDH cross-connect device 118 is connected to other lines as well to provide appropriate cross-connect processing which supports respective lines, it is assumed herein that SONET/SDH is set such that frames on 10G SONET/SDH line #17-1 are delivered as they are to 10G SONET/SDH line 20-1, and frames on 10G SONET/SDH line #17-2 are delivered as they are to 10G SONET/SDH line #20-2.

FE multiplexers 116-1 to 116-n, 121-1 to 121-n each have the same functions and configuration as those in the second embodiment illustrated in FIGS. 13 and 14. The number m of multiplexing provided by respective FE multiplexers 116-1 to 116-n, 121-1 to 121-n is set, for example, to a positive integer equal to or less than eight from the relationship between the capacity of the GbE line and an FE frame transfer band. In other words, the number m of FE paths equal to eight or less are multiplexed on a multiplexed MAC frame (see FIGS. 4A to 4C) which is transferred through the relay GbE line sections.

Likewise, the number m of multiplexing provided by respective GbE multiplexers 117, 120 is set, for example, to a positive integer equal to or less than eight from the relationship between the capacity of the 10G SONET/SDH line and a band in which the data field in the multiplexed MAC frame is transferred. When represented in the number of multiplexing on an FE path, the number m is converted to a positive integer equal to or less than 64. In other words, in the 10G SONET/SDH frame in the relay SONET/SDH line section (see FIGS. 5A to 5C), one FE path is transferred by VC-4, and the number m of FE paths equal to 64 or less are multiplexed on a 10G SONET/SDH frame.

For making a communication between client terminals opposing each other across the relay GbE lines and relay SONET/SDH lines in the wide area Ethernet network illustrated in FIG. 16, as a source client terminal and a destination client terminal are determined, multiplexing/demultiplexing orders are determined in associated FE multiplexers and GbE multiplexers in accordance with transmission paths which connect these client terminals, followed by determination of output ports on the SONET/SDH cross-connect device 118. By thus determining line settings in each node in accordance with the source client terminal and destination client terminal, higher-level protocol data sent from an arbitrary client terminal is transferred only to a determined client terminal. A data flow which passes through a fixed transmission path built by the line settings for transmitting Ethernet frames is called the "Ethernet path." Here, such a transmission path is called the "FE path" when a client line is an FE line, and is called the "GbE path" when a client line is a GbE path. Assume in FIG. 16 that an FE path is set for a transmission path from client terminal 115-1-1 to client terminal 122-1-1, and likewise, FE paths are set between client terminals 115-1-2 and 122-1-2; between client terminals 115-1-3 and 122-1-3; . . . ; between client terminals 115-n-m and 122-n-m, respectively. An FE path may be set between arbitrary client terminals.

Next, the GbE multiplexer in the third embodiment will be described with reference to FIG. 17. As illustrated in FIG.17, GbE multiplexer 117 comprises GbE PHY processing circuits 123-1-1 to 123-n-1, 123-1-2 to 123-n-2 each for transmitting/receiving multiplexed MAC frames to/from an associated relay GbE line; multiplexed MAC frame header generator/terminator circuits 125-1-1 to 125-n-1, 125-1-2 to 125-n-2 each for generating and terminating a multiplexed MAC frame header for each GbE line; GBP relay processing circuits 126-1-1 to 126-n-1, 126-1-2 to 126-n-2 each for detecting CRC errors in GBP capsules and transferring an alarm; multiplexer circuits 127-1, 127-2 each for multiplexing/demultiplexing GBP capsules of each FE path extracted from multiplexed MAC frames in a predefined order; switching unit 128 for switching redundant relay GbE lines and relay SONET/SDH lines; 10G PHY processing circuits 129-1, 129-2 each for transmitting/receiving 10G SONET/SDH frames to/from an associated SONET/SDH line; SONET/SDH transmission/reception processing circuits 130-1, 130-2 each for generating values for respective bytes in the SOH field and POH field for a signal in the SONET/SDH line format on the transmission side, and for detecting each section alarm and each path alarm defined by SONET/SDH from the SOH field and POH field on the reception side; alarm processing circuit 131 for generating an SD (Signal Degrade) signal and an SF (Signal Fail) signal for switching a GbE line or a 10G SONET/SDH line; and APS (Automatic Protection Switching) processing circuit 132 for determining line situations on the active route and spare route of the relay GbE lines to select the active route or spare route. GbE multiplexer 120 is similar to GbE multiplexer 117 in configuration described above.

GbE PHY processing circuits 123-1-1 to 123-n-1, 123-1-2 to 123-n-2 each comprise a physical device for transmitting GbE frames, and a physical device for receiving GbE frames, and transmit/receive multiplexed MAC frames to/from an associated relay GbE line. GbE PHY processing circuits 123-1-1 to 123-n-1, 123-1-2 to 123-n-2 also have a function of detecting an interruption of GbE input.

GbE MAC processing circuits 124-1-1 to 124-n-1, 124-1-2 to 124-n-2 each perform MAC layer processing on the FE frames, and has a function of detecting FE link-down.

Multiplexed MAC frame header generator/terminator circuits 125-1-1 to 125-n-1, 125-1-2 to 125-n-2 each generate and terminate a multiplexed MAC frame header for each GbE line. Specifically, each multiplexed MAC frame header generator/terminator circuit generates a sequence number, a K1 byte, and a K2 byte, and performs HEC operation processing on the transmission side, and checks the continuity of sequence numbers, extracts the K1 byte and K2 byte, and checks the HEC operation on the reception side. Multiplexed MAC frame header generator/terminator circuits 125-1-1 to 125-n-1, 125-1-2 to 125-n-2 also have an APS byte defect detecting function.

GBP relay processing circuits 126-1-1 to 126-n-1,126-1-2 to 126-n-2 each monitor GBP capsules in multiplexed MAC frames transmitted through each GbE line to detect CRC errors in the GBP capsules, and transfer an alarm. Also, GBP relay processing circuits 126-1-1 to 126-n-1, 126-1-2 to 126-n-2 have a function of inserting an idle frame defined by the GBP capsule on the transmission side, and a function of extracting the idle frame defined by the GBP capsule on the transmission side in order to adjust a difference in rate with the FE frame when data is stored in the payload of a VC-4 frame by multiplexer circuits 127-1,127-2.

Multiplexer circuits 127-1,127-2 each multiplex/demultiplex GBP capsules of each FE path extracted from multiplexed MAC frames in a predefined order. A signal delivered from multiplexer circuits 127-1,127-2 to switching unit 128 is defined by the format shown in FIG. 5C, and data on one FE path is stored in one VC-4 frame. However, the format shown in FIG. 5C only reserves fields for the POH and SOH signals, the values of which are generated by SONET/SDH transmission/reception processing circuits 130-1, 130-2.

Switching unit 128 switches the redundant GbE lines between the active route and spare route in response to a switching signal from APS processing circuit 132. The relay GbE lines are redundantly organized by GbE line #16-k-1 and GbE line #16-k-2 which are set to transfer GBP blocks in an FE path from the active GbE line to a 10G SONET/SDH line. Likewise, the relay SONET/SDH lines are redundantly organized, and are set to transfer GBP blocks in an FE path from the active 10G SONET/SDH line to a GbE line.

10G PHY processing circuits 129-1, 129-2 each comprise a physical device for transmitting 10G SONET/SDH frames, and a physical device for receiving 10G SONET/SDH frames, and transmit/receive 10G SONET/SDH frames to/from the relay SONET/SDH lines. 10G PHY processing circuits also 129-1, 129-2 also have a function of detecting an interruption of 10G SONET/SDH optical input.

SONET/SDH transmission/reception processing circuits 130-1, 130-2 each generate a value for each of bytes in SOH and POH for multiplexed signals in the 10G SONET/SDH line format transferred from switching unit 128, and insert the generated values in appropriate fields on the transmission side. On the reception side, SONET/SDH transmission/reception processing circuits 130-1, 130-2 each detect each section alarm and each path alarm defined by SONET/SDH respectively from the SOH field and POH field in each received frame. The detected section alarm is notified to alarm processing circuit 131 on a line-by-line basis, while the path alarm is notified for each path of each line.

Alarm processing circuit 131 collects a variety of error signals detected by the respective circuits mentioned above to generate the SD signal and SF signal for switching the GbE line or 10G SONET/SDH line, and applies APS processing circuit 132 with the SD signal and SF signal for each GbE line or for each 10G SONET/SDH line.

APS processing circuit 132 uses the SD signal and SF signal for each GbE line supplied from alarm processing circuit 131, and the reception-related K1 byte and reception-related K2 byte supplied from multiplexed MAC frame header generator/terminator circuits 125-1-1 to 125-n-1, 125-1-2 to 125-n-2 to determine the line situations for the active route and spare route of the relay GbE lines, respectively, to select the active route or spare route. A selection signal is transferred to switching unit 128. Likewise, APS processing circuit 132 determines the line situations for the active route and spare route of the relay SONET/SDH lines, respectively, from the SD signal and SF signal for each 10G SONET/SDH line supplied from alarm processing circuit 131, and the reception-related K1 byte and reception-related K2 byte supplied from SONET/SDH transmission/reception processing circuits 130-1, 130-2 to select the active route or spare route. A selection signal is transferred to switching unit 128.

APS processing circuit 132 also generates a transmission-related K1 byte and a transmission-related K2 byte which are delivered to multiplexed MAC frame header generator/terminator circuits 125-1-1 to 125-n-1, 125-1-2 to 125-n-2. The selection of the active route or spare route, and the generation of the K1 byte and K2 byte are both performed in accordance with ITU-T Recommendation G.841 (October 1998).

In a configuration in which no redundant relay GbE line is provided, the relay GbE line switching signal should not be changed whichever value is taken by the SD signal and SF signal for each GbE line, and the reception-related K1 byte and reception-related K2 byte. Likewise, in a configuration in which no redundant SONET/SDH line is provided, the relay SONET/SDH line switching signal should not be changed whichever value is taken by the SD signal and SF signal for each SONET/SDH line, and the reception-related K1 byte and reception-related K2 byte.

FIG. 18 shows an alarm identifying method for each error detection signal, executed by the alarm processing circuit in the third embodiment. As shown in FIG. 18, alarms detected by alarm processing circuit 131 are classified into an alarm detected for each FE path, an alarm detected for each GbE line (each section), an alarm detected for each VC-4 path, and an alarm detected for each 10G SONET/SDH line (each section). These detection alarms may be delivered to OpS (network operation system). Also, upon detection of an alarm classified as SD and an alarm classified as SF out of detected alarms, alarm processing circuit 131 applies APS processing circuit 132 with a signal indicative of SD or SF in units of GbE lines (sections) or in units of 10G SONET/SDH lines (sections).

While FIG. 18 shows the alarm identification on the assumption that this is applied in a network configuration which is provided with redundant relay GbE lines and redundant relay SONET/SDH lines, alarm processing circuit 131 can make the alarm identification shown in FIG. 18 from the results of error detections in the respective circuits shown in FIG. 16 even in a network configuration which is not provided with redundant relay GbE lines or redundant relay SONET/SDH lines.

Next, description will be made on the operation of selecting one from the redundant relay GbE lines and one from the redundant relay SONET/SDH lines.

The following description will be made for an example in which GbE line #16-1-1 is assigned as the active route, and GbE line #16-1-2 as the spare route in the operation of the wide area Ethernet network illustrated in FIG. 16.

In these settings, FE multiplexer 116-1 on the transmission side generates a multiplexed MAC frame from data received from client terminals 115-1-1 to 115-1-m, and applies the multiplexed MAC frame to GbE line #16-1-1 and GbE line #16-1-2, respectively.

FE multiplexer 117 receives multiplexed MAC frames from both active and spare relay lines. Then, FE multiplexer 117 extracts main signal data from GbE line #16-1-1 which is the active route, extracts the K1 byte and K2 byte from GbE line #16-1-2 which is the spare route, and determines in APS processing circuit 132 in accordance with the extracted reception-related K1 byte and K2 byte whether or not the switching should be made.

In this event, if a line fault occurs on GbE line #16-1-1 which is the active route, a system switching operation is immediately performed by monitoring the K1 byte and K2 byte communicated between FE multiplexers 116-1 and GbE multiplexer 117, thereby switching GbE line #16-1-2 to the active route and GbE line #16-1-1 to the spare route. These operations can be similarly carried out when the active route is initially assigned to GbE line #16-1-2, and the spare route to GbE line #16-1-1. Also, these operations can be similarly carried out in another redundant system of the relay GbE lines between FE multiplexers 116-i (i is a positive integer satisfying $2 \leq i \leq n$) and GbE multiplexer 117. Further, these operations can be similarly carried out in another redundant system of the relay GbE lines between FE multiplexers 121-j (j is a positive integer satisfying $2 \leq j \leq n$) and GbE multiplexer 120.

Next, description will be made for an operation in which 10G SONET/SDH line #17-1 is assigned as the active route, and 10G SONET/SDH line #17-2 as the spare route in the wide area Ethernet network.

In these settings, GbE multiplexer 117 delivers frames to active and spare 10G SONET/SDH line #17-1 and 10G SONET/SDH line #17-2, respectively.

SONET/SDH cross-connect device 118 receives frames from both the active route and spare route. Then, SONET/SDH cross-connect device 118 extracts main signal data from 10G SONET/SDH line #17-1 which is the active route, extracts the K1 byte and K2 byte from 10G SONET/SDH line #17-2 which is the spare route, and determines in accordance with the extracted reception-related K1 byte and K2 byte whether or not the switching should be made.

In this event, if a line fault occurs on 10G SONET/SDH line #17-1 which is the active route, a system switching operation is immediately performed by monitoring the K1 byte and K2 byte communicated between GbE multiplexer 117 and SONET/SDH cross-connect device 118, thereby switching 10G SONET/SDH line #17-2 to the active route and 10G SONET/SDH line #17-1 to the spare route. These operations can be similarly carried out when the active route is initially assigned to 10G SONET/SDH line #17-2, and the spare route to 10G SONET/SDH line #17-1. Also, the operations can be similarly carried out for lines #20-1 and #20-2 between GbE multiplexer 20 and SONET/SDH cross-connect device 118.

In the wide area Ethernet network illustrated in FIG. 16, the client terminals are implemented by FE terminals by way of example. Alternatively, the wide area Ethernet network of the third embodiment can be applied to any other higher-level protocol such as Fiber Channel as well.

According to the wide area Ethernet network of the third embodiment, even when a transmission network in a relay section is implemented by a combination of an Ethernet (GbE) network and a SONET/SDH network such that the SONET/SDH network is utilized as a transmission network in a certain section, while the GbE network is utilized as a transmission network in another section, transmission medium network layers corresponding to respective sections can be managed irrespective of the type of the transmission networks. Since the GBP capsule can be used to manage a path network layer from an ingress node to an egress node on an end-to-end basis, the networks can be designed, operated, and maintained without awareness of the difference between the transmission networks, thereby providing advanced network services. Further, in such a configuration, it is possible to reduce the circuit scale and mounting area of a relay node which corresponds to a connection of a SONET/SDH network with an Ethernet network. This is because the respective Ethernet networks are provided with the same switching means as that use in the SONET/SDH network to share the APS processing circuit provided for the SONET/SDH network. When a single APS processing circuit can be shared for the SONET/SDH and Ethernet networks, the relay node can be reduced in circuit scale and mounting area.

Also, the automatic protection switching (APS) can be performed as fast as in the SONET/SDH network by using the K1 byte and K2 byte and applying similar APS processing to that used in the SONET/SDH network in a section in which the Ethernet is used as a transmission network.

While preferred embodiments of the present invention have been described using specific terms, such description is for illustrative purposes only, and it is to be understood that changes and variations may be made without departing from the spirit or scope of the following claims.

What is claimed is:

1. An alarm transfer method in a wide area Ethernet network which has Ethernet networks each for accommodating client lines from client terminals and a plurality of types of transmission networks for connecting said Ethernet networks to one another, said alarm transfer method used for mutually notifying said client terminals placed in communication that a fault occurs in said wide area Ethernet network, said alarm transfer method comprising:

dividing an Ethernet frame sent from one of said client terminals every predetermined fixed length to generate a plurality of fixed-length frames;

generating a capsule comprised of each of said fixed-length frames, a type field for notifying a fault occurring on one of said client lines, a forward relay line fault notification field for notifying a second fault occurring in said transmission networks in a forward direction, and a backward relay line fault notification field for notifying the second fault in a backward direction;

multiplexing said generated capsules for each of a plurality of Ethernet paths set between client terminals placed in communication to generate a frame for said transmission networks, and transferring said frame to an Ethernet network which accommodates a destination client terminal; and demultiplexing respective capsules from a received frame, and referencing said type field, said forward relay line fault notification field, and said backward relay line fault notification field to recognize the fault occurring on said one client line or the fault occurring in said transmission networks for each of said Ethernet paths.

2. The method according to claim 1, further comprising:

transferring said forward relay line fault notification down to an egress node which comprises an edge node of an Ethernet network that accommodates the destination client terminal; and issuing a backward relay line fault notification corresponding to said forward relay line fault notification from said egress node to an ingress node which comprises an edge node of an Ethernet network that accommodates a source client terminal.

3. The method according to claim 2, wherein:

said egress node, upon detection of said forward relay line fault notification, sets a client line downstream of a corresponding Ethernet path to link-down when said forward relay line fault notification is not cleared even after lapse of a predetermined protection time, and said ingress node, upon detection of said backward relay line fault notification, sets a client line upstream of a corresponding Ethernet path to link-down.

4. A wide area Ethernet network having Ethernet networks each for accommodating client lines from client terminals, and a plurality of types of transmission networks for interconnecting said Ethernet networks, wherein a fault occurring on one of said client lines or in said transmission networks is mutually notified between said client terminals placed in communication, said wide area Ethernet network comprising:

a multiplexer which functions as an edge node of said Ethernet networks, wherein:

said multiplexer, upon receipt of an Ethernet frame sent from one of said client terminals, divides said Ethernet frame every predetermined fixed length to generate a plurality of fixed-length frames, generates a capsule comprised of each of said fixed-length frames, a type field for notifying a fault occurring on one of said client lines, a forward relay line fault notification field for notifying a second fault occurring in said transmission networks in a forward direction, and a backward relay line fault notification field for notifying the second fault in a backward direction, multiplexes said generated capsules for each of a plurality of Ethernet paths set between client terminals placed in communication to generate a frame for said transmission networks, and transfers said frame to an Ethernet network which accommodates a destination client terminal; and said multiplexer, upon receipt of a frame from said transmission networks, demultiplexes respective capsules from said frame for each of the Ethernet paths set between the client terminals placed in communication, and references said type field, said forward relay line fault notification field, and said backward relay line fault notification field to recognize the fault occurring on said one client line or the fault occurring in said transmission networks for each of said Ethernet paths.

5. The wide area Ethernet network according to claim 4, wherein:

said multiplexer issues said forward relay line fault notification to an egress node which comprises an edge node of an Ethernet network that accommodates a destination client terminal when said multiplexer operates as an ingress node which comprises an edge node of an Ethernet network that accommodates a source client terminal; and said multiplexer, upon detection of said forward relay line fault notification, issues a backward relay line fault notification corresponding to said forward relay line fault notification toward said ingress node, when said multiplexer operates as said egress node.

6. The wide area Ethernet network according to claim 5, wherein:

said multiplexer, upon detection of said forward relay line fault notification, forcefully sets a client line downstream of a corresponding Ethernet path to link-down when said forward relay line fault notification is not cleared even after lapse of a predetermined protection time when said multiplexer operates as said egress node, and said multiplexer, upon detection of said backward relay line fault notification, immediately sets a client line upstream of a corresponding Ethernet path forcefully to link-down when said multiplexer operates as said ingress node.

7. A wide area Ethernet network comprising:

an ingress node for dividing a higher-level protocol data sent from each of a plurality of client terminals every predetermined fixed length to generate a plurality of fixed-length frames, generating a capsule comprised of each of said fixed-length frames, a CRC field for detecting whether or not the data sent from said each client terminal is normal, a type field for notifying a fault occurring on a client line, a forward relay line fault notification field for notifying a second fault occurring in a transmission network in a forward direction, and a backward relay line fault notification field for notifying said second fault in a backward direction, multiplexing said capsules in a predefined order and adding an FCS field for detecting whether or not data in said capsules is normal to generate a multiplexed MAC frame, and sending said multiplexed MAC frame; and an egress node for detecting a defective data reception for each Ethernet path of a plurality of Ethernet paths from the result of checking said CRC field added to said fixed-length frame, detecting a relay line fault in the forward direction and in the backward direction for each Ethernet path from information in said type field, said forward relay line fault notification field, and said backward relay line fault notification field, identifying an alarm for a path network layer from said detected defective data reception and said relay line fault information, detecting a defective data reception for each forward relay line and backward relay line from the result of checking said FCS field added to said multiplexed MAC frame, and detecting loss of signal and link-down for each line to identify an alarm for a transmission medium network layer.

8. The wide area Ethernet network according to claim 7, further comprising:

a relay node for relaying said multiplexed MAC frame transmitted/received between said ingress node and said egress node by multiplexing frames defined by SONET/SDH into said multiplexed MAC frame or demultiplexing said multiplexed MAC frame into said SONET/SDH defined frames, identifying an alarm on a path-by-path basis from a POH byte defined by said SONET/SDH, and identifying an alarm on a section-by-section basis from an SOH byte defined by said SONET/SDH.

9. The wide area Ethernet network according to claim 8, wherein:

said multiplexed MAC frame has a multiplexed MAC frame header placed at top of said multiplexed capsules, said header including a sequence number, a K1 byte, a K2 byte, and an HEC field.

10. The wide area Ethernet network according to claim 9, wherein:

said ingress node and said egress node are connected through an active line and a spare line;

said ingress node and said relay node are connected through an active line and a spare line;

said egress node and said relay node are connected through an active line and a spare line;

each of said ingress node, said egress node, and said relay node generates an SD signal and an SF signal from a result of said defective data reception, said loss of signal, and said link-down detected for each line, and each of said ingress node, said egress node, and said relay node generates a K1 byte and a K2 byte to be transmitted from the K1 byte and K2 byte received thereby and the SD signal and the SF signal for each line, stores a transmission-related K1 byte and K2 byte in said multiplexed MAC frame header for transmission, and makes a determination for switching a line to which said multiplexed MAC frame is delivered between said active line and said spare line, and switches the line to which said multiplexed MAC frame is delivered from a result of the determination.

11. The wide area Ethernet network according to claim 7, wherein said multiplexed MAC frame comprises a multiplexed MAC frame header placed at top of said multiplexed capsules, said header including a sequence number, a K1 byte, a K2 byte, and an HEC field.

12. The wide area Ethernet network according to claim 11, wherein:

said ingress node and said egress node are connected through an active line and a spare line, and each generate an SD signal and an SF signal from the results of said defective data reception, said loss-of-signal detection, and said link-down detection detected for each line; and said ingress node and said egress node each generate a K1 byte and a K2 byte to be transmitted from the K1 byte and K2 byte received thereby and the SD signal and the SF signal for each active line and spare line, store a transmission-related K1 byte and K2 byte in said multiplexed MAC frame header for transmission, and make a determination for switching a line to which said multiplexed MAC frame is delivered between said active line and said spare line, and switch the line to which said multiplexed MAC frame is delivered from a result of the determination.

13. An Ethernet multiplexer for relaying information transmitted/received between Ethernet networks for accommodating client lines from client terminals and a plurality of types of transmission networks for connecting said Ethernet networks to each other, said Ethernet multiplexer serving as an edge node of each of said Ethernet networks, comprising:

a GbE_MAC processing circuit for transmitting and receiving a frame to and from said transmission networks, and for detecting a fault occurring on any of said transmission networks;

a TDM_MUX/DEMUX circuit for time-division-multiplexing or demultiplexing frames transmitted in an upstream direction or in a downstream direction in units of a plurality of Ethernet paths set between client terminals placed in communication;

an FE_MAC processing circuit for detecting transmission/reception of an Ethernet frame to/from one of said client lines, and detecting a fault occurring on said one client line; and a GBP processing circuit, in response to a received Ethernet frame sent from one of said client terminals, for dividing said Ethernet frame every predetermined length to generate fixed-length frames, generating a capsule including a core block of comprising each of said fixed-length frames and a type field added thereto for notifying a fault occurring on said one client line, a forward relay line fault notification field for notifying a second fault occurring in said transmission networks in a forward direction, and a backward relay line fault notification field for notifying said second fault in a backward direction, said GBP processing circuit, upon detection of a fault occurring on one of said client lines, adding a code indicative of the fault on said one client line to said type field, and overwriting a payload with a predefined idle frame, said GBP processing circuit, upon receipt of a frame from one of said transmission networks, monitors said core block, said forward relay line fault notification field, and said backward relay line fault notification field, respectively, to identify a fault occurring on said one client line or a fault occurring in said transmission networks for each of said Ethernet paths.

14. The Ethernet multiplexer according to claim 13, wherein:

said GBP processing circuit issues said forward relay line fault notification to an egress node which comprises an edge node of an Ethernet network that accommodates a destination client terminal when said GBP processing circuit operates as an ingress node which comprises an edge node of an Ethernet network that accommodates a source client terminal; and said GBP processing circuit, upon detection of said forward relay line fault notification, issues a backward relay line fault notification corresponding to said forward relay line fault notification toward said ingress node when said GBP processing circuit operates as said egress node.

15. The Ethernet multiplexer according to claim 14, wherein:

said GBP processing circuit, upon detection of said forward relay line fault notification, forcefully sets a client line downstream of a corresponding Ethernet path to link-down when said fault notification is not cleared even after lapse of a predetermined protection time when said GBP multiplexer operates as said egress node, and said GBP multiplexer, upon detection of said backward relay line fault notification, immediately sets a client line upstream of a corresponding Ethernet path forcefully to link-down when said GBP multiplexer operates as said ingress node.

16. An Ethernet multiplexer for relaying a capsule transmitted/received between Ethernet networks each for accommodating client lines from client terminals and a transmission network for interconnecting said Ethernet networks, said capsule including a type field for notifying a fault occurring on one of said client lines, a forward relay line fault notification field for notifying a second fault occurring in said transmission network in a forward direction, and a backward relay line fault notification field for notifying said second fault in a backward direction, said Ethernet multiplexer comprising:

a terminator circuit for transmitting/receiving frames to/from said transmission network, and detecting a line fault in said transmission network;

a TDM_MUX/DEMUX circuit for time-division-multiplexing or demultiplexing frames transmitted in an upstream direction or in a downstream direction in a predefined order in units of a plurality of Ethernet paths which are set between client terminals placed in communication;

a MAC processing circuit for transmitting/receiving frames to/from said Ethernet networks, and detecting a line fault in said Ethernet networks; and a GBP relay processing circuit for relaying said capsule for each of said Ethernet paths, and in response to a fault detected by said terminator circuit or said MAC processing circuit, setting a code indicative of the presence of a line fault in said forward relay line fault notification field, setting a code indicative of the absence of a line fault in said backward relay line fault notification field, setting a code indicative of no fault on said client lines in said type field, and setting a predefined idle frame in a payload.

17. An alarm transfer method in a wide area Ethernet network which has Ethernet networks each for accommodating client lines from client terminals and a plurality of types of transmission networks for connecting said Ethernet networks to one another, said alarm transfer method comprising:

dividing an Ethernet frame sent from one of said client terminals every predetermined fixed length to generate a plurality of fixed-length frames; and generating a capsule comprised of each of said fixed-length frames, a type field for notifying a fault occurring on one of said client lines, a forward relay line fault notification field for notifying a second fault occurring in said transmission networks in a forward direction, and a backward relay line fault notification field for notifying the second fault in a backward direction.

18. The alarm transfer method in a wide area Ethernet network according to claim 17, further comprising:

multiplexing said generated capsules for each of a plurality of Ethernet paths set between client terminals placed in communication to generate a frame for said transmission networks, and transferring said frame to an Ethernet network which accommodates a destination client terminal.

19. The alarm transfer method in a wide area Ethernet network according to claim 18, further comprising:

demultiplexing respective capsules from a received frame, and referencing said type field, said forward relay line fault notification field, and said backward relay line fault notification field to recognize the fault occurring on said one client line or the fault occurring in said transmission networks for each of said Ethernet paths.

* * * * *